United States Patent
Kumakura

(10) Patent No.: US 10,298,922 B2
(45) Date of Patent: *May 21, 2019

(54) PICTURE CODING DEVICE, PICTURE CODING METHOD AND PICTURE CODING PROGRAM AS WELL AS PICTURE DECODING DEVICE, PICTURE DECODING METHOD, AND PICTURE DECODING PROGRAM

(71) Applicant: FUNAI ELECTRIC CO., LTD., Osaka (JP)

(72) Inventor: Toru Kumakura, Yokohama (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,298

(22) Filed: Apr. 20, 2018

(65) Prior Publication Data

US 2018/0249153 A1   Aug. 30, 2018

Related U.S. Application Data

(63) Continuation of application No. 15/807,353, filed on Nov. 8, 2017, now Pat. No. 10,015,487, which is a
(Continued)

(30) Foreign Application Priority Data

May 30, 2011   (JP) ................................. 2011-120782
May 30, 2011   (JP) ................................. 2011-120783
(Continued)

(51) Int. Cl.
*H04N 19/10*   (2014.01)
*H04N 19/11*   (2014.01)
(Continued)

(52) U.S. Cl.
CPC ............. *H04N 19/10* (2014.11); *H04N 19/11* (2014.11); *H04N 19/159* (2014.11); *H04N 19/176* (2014.11); *H04N 19/46* (2014.11)

(58) Field of Classification Search
CPC ...... H04N 19/176; H04N 19/11; H04N 19/10; H04N 19/159; H04N 19/46
(Continued)

(56) References Cited

U.S. PATENT DOCUMENTS

2010/0290521 A1   11/2010   Liu et al.
2011/0292994 A1   12/2011   Lim et al.
(Continued)

FOREIGN PATENT DOCUMENTS

CN   101309408 A   11/2008
JP   2009-246975 A   10/2009
(Continued)

OTHER PUBLICATIONS

ISO/IEC 14496-10 Information technology—Coding of audio-visual objects—part 10: Advanced Video Coding. [Cited in Parent].
(Continued)

*Primary Examiner* — On S Mung
(74) *Attorney, Agent, or Firm* — Venable LLP; Jeffri A. Kaminski

(57) ABSTRACT

A prediction direction difference calculating unit derives a prediction direction difference in intra prediction modes of a plurality of reference blocks used for an intra prediction processing of a block to be coded. A most probable mode determining unit and a coding tree selecting unit determine a most probable mode as an intra prediction mode candidate of the block to be coded based on the intra prediction modes of the reference blocks used for deriving the prediction direction difference and the prediction direction difference, and creates a coding tree assigned with a bit stream having
(Continued)

a shorter code length than other prediction modes for the determined most probable mode. A variable length coding unit codes information for specifying an intra prediction mode of the block to be coded according to the coding tree.

3 Claims, 34 Drawing Sheets

Related U.S. Application Data continuation of application No. 14/091,018, filed on Nov. 26, 2013, now Pat. No. 9,843,799, which is a continuation of application No. PCT/JP2012/003472, filed on May 28, 2012.

(30) Foreign Application Priority Data

Jun. 16, 2011 (JP) ................................ 2011-134558
Jun. 16, 2011 (JP) ................................ 2011-134559

(51) Int. Cl.
*H04N 19/46* (2014.01)
*H04N 19/159* (2014.01)
*H04N 19/176* (2014.01)

(58) Field of Classification Search
USPC .......................... 375/240.12, 240.24, 240.25
See application file for complete search history.

(56) References Cited

U.S. PATENT DOCUMENTS

2011/0317757 A1  12/2011  Coban et al.
2012/0224777 A1   9/2012  Kim et al.

FOREIGN PATENT DOCUMENTS

TW     201110708 A    3/2011
WO    2010/087157 A1  8/2010
WO     2011021844 A2  2/2011
WO    2012/087035 A2  6/2012

OTHER PUBLICATIONS

Toru Kumakura et al., "Intra prediction mode coding based on direction difference," Joint Collaborative Team on Video Coding (JCT-VC) of ITU-T SG16 WP3 and ISO/IEC JTC1/SC29/WG11 6th Meeting: Torino, IT, Document: JCTVC-F339, ITU-T, Jul. 1, 2011. [Cited in Parent].

Mei Guo et al., "Context Dependent Intra Mode Coding," Joint Collaborative Team on Video Coding (JCT-VC) of ITU-T SG16 WP3 abd ISO/IEC JTC1/SC29/WG11 5th Meeting: Geneva, Switzerland, Document: JCTVC-E201, ITU-T, Mar. 15, 2011. [Cited in Parent].

Mei Guo et al., "Improved Intra Mode Coding," Joint Collaborative Team on Video Coding (JCT-VC) of ITU-T SG16 WP3 and ISO/IEC JTC1/SC29/WG11 4th Meeting: Daegu, Korea, Document: JCTVC-D166, ITU-T, Jan. 15, 2011. [Cited in Parent].

Ehsan Maani et al., "Differential Coding of Intra Modes (DCIM)," Joint Collaborative Team on Video Coding (JCT-VC) of ITU-T SG16 WP3 and ISO/IEC JTC1/SC29/WG11 2nd Meeting: Geneva, Switzerland, Document: JCTVC-B109, ITU-T, Jul. 16, 2010. [Cited in Parent].

Tomoyuki Yamamoto et al., "Flexible Representation of Intra Prediction Modes," Joint Collaborative Team on Video Coding (JCT-VC) of ITU-T SG16 WP3 and ISO/IEC JTC1/SC29/WG11 2nd Meeting: Geneva, Switzerland, Document: JCTVC-B063, ITU-T, Jul. 16, 2010. [Cited in Parent].

International Search Report in PCT International Application No. PCT/JP2012/003472, dated Aug. 28, 2012. [Cited in Parent].

International Preliminary Report on Patentability and Written Opinion in PCT International Application No. PCT/JP2012/003472, dated Dec. 2, 2013. [Cited in Parent].

| MODE NUMBER | PREDICTION DIRECTION |
|---|---|
| 0 | vertical |
| 1 | horizontal |
| 2 | DC |
| 3 | Diagonal down left |
| 4 | Diagonal down right |
| 5 | Vertical right |
| 6 | Horizontal down |
| 7 | Vertical left |
| 8 | Horizontal up |

FIG.4A

```
// INTRA PREDICTION MODE CODING SYNTAX
prev_intra_pred_flag
if(!prev_intra_pred_flag) {
  rem_intra_pred_mode
}
```

FIG.4B

```
// INTRA PREDICTION MODE CODING SYNTAX
prev_intra_pred_flag
if(!prev_intra_pred_flag) {
  refer_block_flag
} else {
  rem_intra_pred_mode
}
```

FIG.13

| MODE NUMBER | PREDICTION DIRECTION NUMBER |
|---|---|
| 0 | 0 |
| 1 | 8 |
| 2 | – |
| 3 | 4 |
| 4 | 2 |
| 5 | 14 |
| 6 | 12 |
| 7 | 6 |
| 8 | 10 |
| 9 | 12 |
| 10 | 3 |
| 11 | 1 |
| 12 | 15 |
| 13 | 13 |
| 14 | 5 |
| 15 | 7 |
| 16 | 9 |

FIG.14

| DIRECTION DIFFERENCE | NUMBER OF MOST PROBABLE MODES | FIRST MOST PROBABLE MODE | SECOND MOST PROBABLE MODE | THIRD MOST PROBABLE MODE | FOURTH MOST PROBABLE MODE | FIFTH MOST PROBABLE MODE | SIXTH MOST PROBABLE MODE | SEVENTH MOST PROBABLE MODE | CODING TREE NUMBER |
|---|---|---|---|---|---|---|---|---|---|
| 0 | 3 | SAME MODE | NEIGHBORING 1 | NEIGHBORING 2 | - | - | - | - | 0 |
| 1 | 4 | MODE A | MODE B | NEIGHBORING 1 | NEIGHBORING 2 | - | - | - | 1 |
| 2 | 5 | MODE A | MODE B | NEIGHBORING 1 | NEIGHBORING 2 | NEIGHBORING 3 | - | - | 2 |
| 3 | 6 | MODE A | MODE B | NEIGHBORING 1 | NEIGHBORING 2 | NEIGHBORING 3 | NEIGHBORING 4 | - | 3 |
| 4 | 7 | MODE A | MODE B | NEIGHBORING 1 | NEIGHBORING 2 | NEIGHBORING 3 | NEIGHBORING 4 | NEIGHBORING 5 | 4 |
| 5 | 7 | MODE A | MODE B | NEIGHBORING 1 | NEIGHBORING 2 | NEIGHBORING 3 | NEIGHBORING 4 | DC | 5 |
| 6 | 5 | MODE A | MODE B | NEIGHBORING 1 | NEIGHBORING 2 | DC | - | - | 6 |
| 7 | 3 | MODE A | MODE B | DC | - | - | - | - | 7 |
| 8 | 3 | MODE A | MODE B | DC | - | - | - | - | 8 |
| -1 | 4 | MODE A | MODE B | NEIGHBORING 1 | NEIGHBORING 2 | - | - | - | 9 |
| -2 | 1 | DC | - | - | - | - | - | - | 10 |

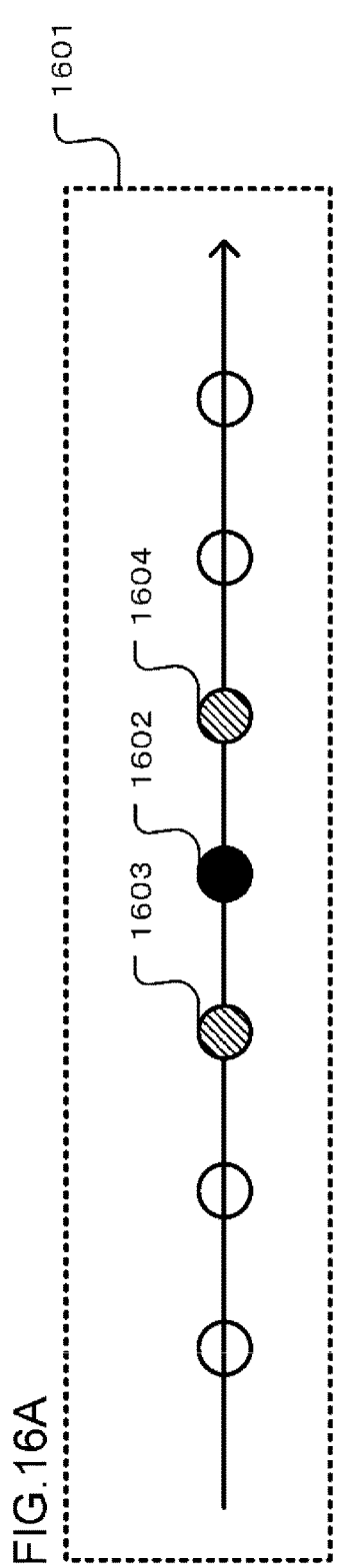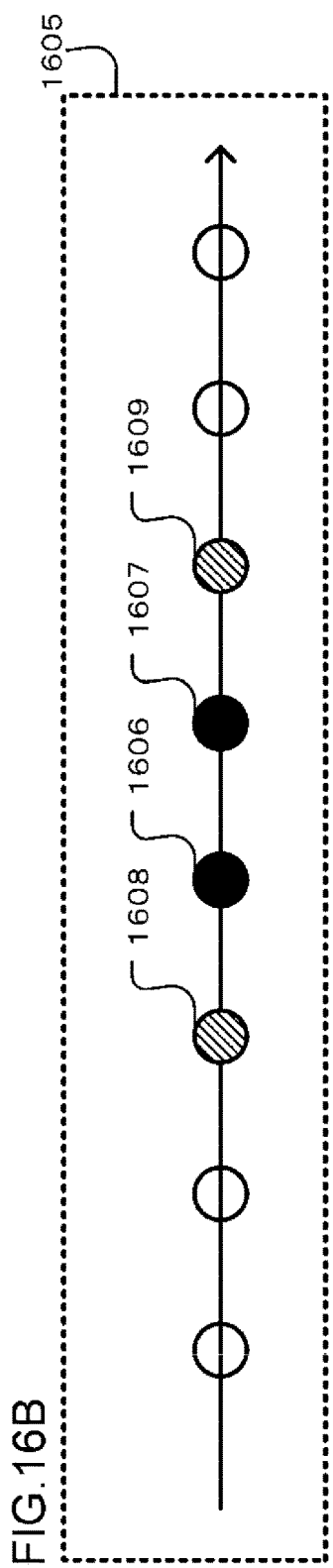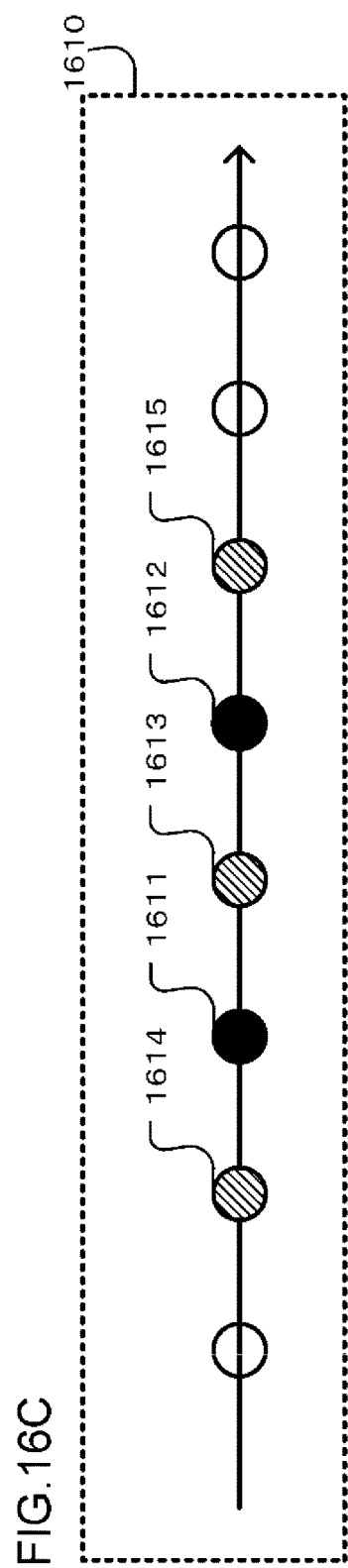

FIG.32

| diffDir | mpmList Size | mpmList [0] | mpmList [1] | mpmList [2] | mpmList [3] | mpmList [4] | mpmList [5] | mpmList [6] |
|---|---|---|---|---|---|---|---|---|
| −2 | 2 | refModeA | 0 | - | - | - | - | - |
| −1 | 4 | min(refModeA, refModeB) | max(refModeA, refModeB) | left[dirMode] | right[dirMode] | - | - | - |
| 0 | 3 | refModeA | left[refModeA] | right[refModeA] | - | - | - | - |
| 1 | 4 | min(refModeA, refModeB) | max(refModeA, refModeB) | left[leftMode] | right[rightMode] | - | - | - |
| 2 | 5 | min(refModeA, refModeB, interMode) | median(refModeA, refModeB, interMode) | max(refModeA, refModeB, interMode) | left[leftMode] | Right[rightMode] | - | - |
| 3 OR MORE (4×4) | 5 | min(refModeA, refModeB) | max(refModeA, refModeB) | min(left[leftMode], right[leftMode]) | min(left[rightMode], right[rightMode]) | 2 | - | - |
| 3 OR MORE (8×8, 16×16) | 7 | min(refModeA, refModeB) | max(refModeA, refModeB) | left[leftMode] | right[leftMode] | Left[rightMode] | Right[rightMode] | 2 |

PICTURE CODING DEVICE, PICTURE CODING METHOD AND PICTURE CODING PROGRAM AS WELL AS PICTURE DECODING DEVICE, PICTURE DECODING METHOD, AND PICTURE DECODING PROGRAM

CROSS-REFERENCE TO RELATED APPLICATIONS

This application is a Continuation of U.S. patent application Ser. No. 15/807,353, filed Nov. 8, 2017, which is a Continuation of U.S. patent application Ser. No. 14/091,018, filed Nov. 26, 2013, now U.S. Pat. No. 9,843,799, which is a Continuation of International Application No. PCT/JP2012/003472, filed on May 28, 2012, which in turn claims the benefit of Japanese Application Nos. 2011-120782 and 2011-120783, filed on May 30, 2011, and 2011-134558 and 2011-134559, filed on Jun. 16, 2011.

BACKGROUND

The present invention relates to picture coding and decoding techniques, and particularly to intra coding and decoding techniques.

MPEG-4 AVC as an international standard of moving picture coding employs a system called intra prediction as an intra coding system for completing processing in one screen. The intra prediction is directed for duplicating a decoded sample value neighboring to a block to be processed in a designated prediction direction thereby to create a prediction picture of the block to be processed. MPEG-4 AVC defines nine prediction directions illustrated in FIGS. 1A and 1B, and is configured to transmit a mode number of an intra prediction mode indicating a prediction direction of each block thereby to designate a proper prediction direction.

The number of defined prediction directions is increased, thereby enhancing prediction picture quality. Reference numeral 201 in FIG. 2A indicates 17 exemplary defined prediction directions, and reference numeral 202 in FIG. 2B indicates 34 exemplary defined prediction directions. However, an increase in defined prediction directions leads to an increase in transmission information of intra prediction modes. As the number of defined prediction directions increases, a rate of intra prediction modes in all the occurred codes increases, and thus the need of an efficient transmitting method enhances.

JP2009-246975A describes therein a means for reducing the amount of codes of intra prediction modes by reducing the total number of intra prediction modes to be transmitted. The method in JP2009-246975A is directed for scanning intra prediction modes of a plurality of blocks for predetermined units of unification and transmitting one intra prediction mode in units of unification when all the intra prediction modes in the units of unification are the same, thereby reducing intra prediction modes to be transmitted.

CITATION LIST

Patent Literature

Patent Literature 1: JP 2009-246975 A

Non-Patent Literature

Non-Patent Literature 1: ISO/IEC 14496-10 Information technology—Coding of audio-visual objects—Part 10: Advanced Video Coding Typically, intra prediction is directed for coding an intra prediction mode based on an occurrence probability model of intra prediction modes in which the same intra prediction mode as an intra prediction mode of a neighboring block of a block to be coded in a picture is likely to be selected also in the block to be coded. However, since an occurrence distribution of intra prediction modes is actually different per block, further efficient coding of the intra prediction modes is difficult to achieve in the coding which always sets the same probability model for all the blocks.

The method in JP 2009-246975 A does not consider an occurrence frequency of intra prediction modes in each block, and thus the above problem remains unsolved.

SUMMARY

The present invention has been made in terms of the situation, and an object thereof is to provide a picture coding technique capable of reducing the amount of occurred codes of intra prediction modes and further enhancing coding efficiency.

In order to solve the above problems, a picture coding device according to an aspect of the present invention codes a picture signal by use of an intra prediction mode selected from a plurality of intra prediction modes in units of block and codes information for specifying the selected intra prediction mode, the picture coding device including an intra prediction mode selecting unit (509) for selecting an intra prediction mode of a block to be coded, an intra prediction mode storing unit (601) for storing intra prediction modes of coded blocks, a prediction direction difference deriving unit (604) for deriving intra prediction modes of a plurality of reference blocks used for an intra prediction processing of the block to be coded from the intra prediction mode storing unit, and deriving a prediction direction difference indicating a degree of difference in prediction directions of the derived intra prediction modes, a coding tree creating unit (603, 605) for determining a most probable mode as an intra prediction mode candidate of the block to be coded based on the intra prediction modes of the reference blocks used for deriving the prediction direction difference and the prediction direction difference, and creating a coding tree assigned with a bitstream having a shorter code length than other prediction modes for the determined most probable mode, and a coding unit (606) for coding information for specifying an intra prediction mode of the block to be coded according to the coding tree.

Another aspect of the present invention is a picture coding method. The method codes a picture signal by use of an intra prediction mode selected from a plurality of intra prediction modes in units of block and codes information for specifying the selected intra prediction mode, the method including a step of selecting an intra prediction mode of a block to be coded, a step of deriving intra prediction modes of a plurality of reference blocks used for an intra prediction processing of the block to be coded from the intra prediction mode storing unit with reference to a memory for storing intra prediction modes of coded blocks, and deriving a prediction direction difference indicating a degree of difference in prediction directions of the derived intra prediction modes, a step of determining a most probable mode as an intra prediction mode candidate of the block to be coded based on the intra prediction modes of the reference blocks used for deriving the prediction direction difference and the prediction direction difference, and creating a coding tree assigned with a bitstream having a shorter code length than other prediction modes for the determined most probable mode, and a step of coding information for specifying an intra prediction mode of the block to be coded according to the coding tree.

Still another aspect of the present invention is a picture coding device. The device codes a picture signal by use of an intra prediction mode selected from a plurality of intra prediction modes in units of block and codes information for specifying the selected intra prediction mode, the device including an intra prediction mode selecting unit (509) for selecting an intra prediction mode of a block to be coded, an intra prediction mode storing unit (2601) for storing intra prediction modes of coded blocks, a prediction direction difference deriving unit (2610) for deriving intra prediction modes of a plurality of reference blocks used for intra prediction of the block to be coded from the intra prediction mode storing unit, and deriving a prediction direction difference indicating a degree of difference in prediction directions of the derived intra prediction modes, a most probable mode list creating unit (2602) for creating a list of most probable modes as intra prediction mode candidates of the block to be coded based on the intra prediction modes of the reference blocks used for deriving the prediction direction difference and the prediction direction difference, a most probable mode determination flag calculating unit (2603) for calculating information indicating whether the intra prediction mode of the block to be coded is a most probable mode, a most probable mode determination flag coding unit (2604) for coding information indicating whether the intra prediction mode of the block to be coded is a most probable mode, a most probable mode coding unit (2606) for, when the intra prediction mode of the block to be coded is a most probable mode, coding information for specifying an intra prediction mode of the block to be coded based on the created list, and a non-most probable mode coding unit (2608) for, when the intra prediction mode of the block to be coded is a non-most probable mode, coding information for specifying an intra prediction mode of the block to be coded based on the list.

Still another aspect of the present invention is a picture coding method. The method codes a picture signal by use of an intra prediction mode selected from a plurality of intra prediction modes in units of block and codes information for specifying the selected intra prediction mode, the method including a step of selecting an intra prediction mode of a block to be coded, a step of deriving intra prediction modes of a plurality of reference blocks used for intra prediction of the block to be coded from the intra prediction mode storing unit with reference to a memory for storing intra prediction modes of coded blocks, and deriving a prediction direction difference indicating a degree of difference in prediction directions of the derived intra prediction modes, a step of creating a list of most probable modes as intra prediction mode candidates of the block to be coded based on the intra prediction modes of the reference blocks used for deriving the prediction direction difference and the prediction direction difference, a step of calculating information indicating whether the intra prediction mode of the block to be coded is a most probable mode, a step of coding information indicating whether the intra prediction mode of the block to be coded is a most probable mode, a step of, when the intra prediction mode of the block to be coded is a most probable mode, coding information for specifying an intra prediction mode of the block to be coded based on the created list, and a step of, when the intra prediction mode of the block to be coded is a non-most probable mode, coding information for specifying an intra prediction mode of the block to be coded based on the list.

A picture decoding device according to an aspect of the present invention decodes information for specifying an intra prediction mode in units of block from a bitstream and decodes a picture signal by use of information for specifying a decoded intra prediction mode, the device including an intra prediction mode storing unit (901) for storing intra prediction modes of decoded blocks, a prediction direction difference deriving unit (904) for deriving intra prediction modes of a plurality of reference blocks used for an intra prediction processing of a block to be decoded from the intra prediction mode storing unit, and deriving a prediction direction difference indicating a degree of difference in prediction directions of the derived intra prediction modes, a decoding tree creating unit (903, 905) for determining a most probable mode as an intra prediction mode candidate of the block to be decoded based on the intra prediction modes of the reference blocks used for deriving the prediction direction difference and the prediction direction difference, and creating a decoding tree assigned with a bitstream having a shorter code length than other prediction modes for the determined most probable mode, and a decoding unit (906) for decoding information for specifying an intra prediction mode of the block to be decoded according to the decoding tree.

Still another aspect of the present invention is a picture decoding method. The method decodes information for specifying an intra prediction mode in units of block from a bitstream and decodes a picture signal by use of information for specifying a decoded intra prediction mode, the method including a step of deriving intra prediction modes of a plurality of reference blocks used for an intra prediction processing of a block to be decoded from the intra prediction mode storing unit with reference to a memory for storing intra prediction modes of decoded blocks, and deriving a prediction direction difference indicating a degree of difference in prediction directions of the derived intra prediction modes, a step of determining a most probable mode as an intra prediction mode candidate of the block to be decoded based on the intra prediction modes of the reference blocks used for deriving the prediction direction difference and the prediction direction difference, and creating a decoding tree assigned with a bitstream having a shorter code length than other prediction modes for the determined most probable mode, and a step of decoding information for specifying an intra prediction mode of the block to be decoded according to the decoding tree.

Still another aspect of the present invention is a picture decoding device. The device decodes information for specifying an intra prediction mode in units of block from a bitstream and decodes a picture signal by use of information for specifying a decoded intra prediction mode, the device including an intra prediction mode storing unit (2901) for storing intra prediction modes of decoded blocks, a prediction direction difference deriving unit (2908) for deriving intra prediction modes of a plurality of reference blocks used for an intra prediction processing of a block to be decoded, and deriving a prediction direction difference indicating a degree of difference in prediction directions of the derived intra prediction modes, a most probable mode list creating unit (2902) for creating a list of most probable modes as intra prediction mode candidates of the block to be decoded based on the intra prediction modes of the reference blocks used for deriving the prediction direction difference and the prediction direction difference, a most probable mode determination flag decoding unit (2903) for decoding information indicating whether the intra prediction mode of the block to be decoded is a most probable mode, a most probable mode decoding unit (2904) for, when the intra prediction mode of the block to be decoded is a most probable mode, decoding information for specifying an intra prediction mode of the block to be decoded based on the created list, and a non-most probable mode decoding unit (2906) for, when the intra prediction mode of the block to be decoded is a non-most probable mode, decoding information for specifying an intra prediction mode of the block to be decoded based on the list.

Still another aspect of the present invention is a picture decoding method. The method decodes information for specifying an intra prediction mode in units of block from a bitstream and decodes a picture signal by use of information for specifying a decoded intra prediction mode, the method including a step of deriving intra prediction modes of a plurality of reference blocks used for an intra prediction processing of a block to be decoded from the intra prediction mode storing unit with reference to a memory for storing intra prediction modes of decoded blocks, and deriving a prediction direction difference indicating a degree of difference in prediction directions of the derived intra prediction modes, a step of creating a list of most probable modes as intra prediction mode candidates of the block to be decoded based on the intra prediction modes of the reference blocks used for deriving the prediction direction difference and the prediction direction difference, a step of decoding information indicating whether the intra prediction mode of the block to be decoded is a most probable mode, a step of, when the intra prediction mode of the block to be decoded is a most probable mode, decoding information for specifying an intra prediction mode of the block to be decoded based on the created list, and a step of, when the intra prediction mode of the block to be decoded is a non-most probable mode, decoding information for specifying an intra prediction mode of the block to be decoded.

Any combinations of the above components and expressions of the present invention converted between methods, devices, systems, recording mediums and computer programs are also effective as forms of the present invention.

BRIEF DESCRIPTION OF THE DRAWINGS

FIGS. 4A and 4B are diagrams for explaining coding syntax for transmitting an intra prediction mode according to the coding trees of FIGS. 3A and 3B;

FIG. 13 is a diagram for explaining a table in which a prediction mode is associated with a prediction direction number;

FIG. 14 is a diagram for explaining a table in which a prediction direction difference is associated with a most probable mode and a coding tree;

FIGS. 16A-16C are conceptual diagrams for explaining a most probable mode determined depending on a prediction direction difference;

FIG. 32 is a diagram for explaining a correspondence between a prediction direction difference and a most probable mode list according to the second example;

DETAILED DESCRIPTION

The invention will now be described by reference to the preferred embodiments. This does not intend to limit the scope of the present invention, but to exemplify the invention.

A technique on which an embodiment of the present invention is based will be first described.

In the following description, a "block to be processed" is a block to be coded in a coding processing by a picture coding device, and a block to be decoded in a decoding processing by a picture decoding device. A "processed block" is a decoded block which has been coded in the coding processing by the picture coding device, and a decoded block in the decoding processing by the picture decoding device. The meaning will be used unless otherwise noted.

[Coding Tree]

Figures 1A, 1B:
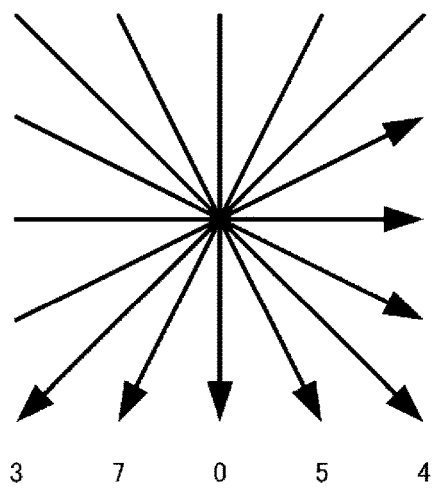
FIGS. 1A and 1B are diagrams for explaining prediction directions of nine intra prediction mode patterns.
Figures 3A, 3B:
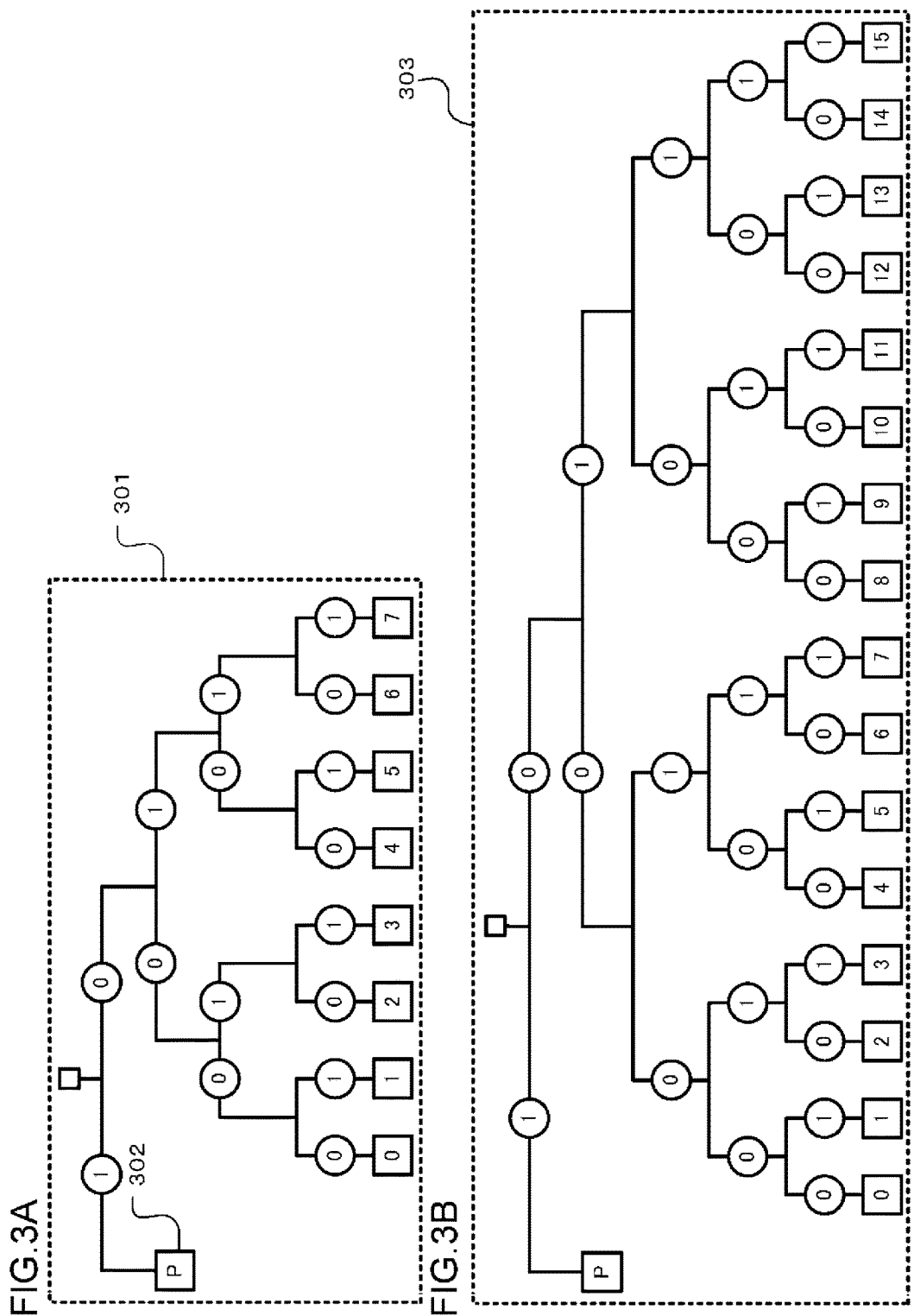
FIGS. 3A and 3B are diagrams for explaining coding trees for coding nine intra prediction mode patterns.

FIGS. 3A and 3B are diagrams for explaining coding trees for coding nine intra prediction mode patterns of FIGS. 1A and 1B. An intra prediction mode transmitting method in MPEG-4 AVC is based on a coding tree indicated in reference numeral 301 in FIG. 3A. In the figure, a numeral is assigned to an internal node (circle) and an intra prediction mode number is assigned to a leaf (square). Reference numeral 302 of a leaf is a most probable mode. The most probable mode will be described later. For example, "1" is assigned to a most probable mode and "0111" is assigned to a mode 7.

FIGS. 4A and 4B are diagrams for explaining coding syntax for transmitting an intra prediction mode according to the coding trees in FIGS. 3A and 3B. prev_intra_pred_flag illustrated in FIGS. 4A and 4B indicates a syntax component for specifying a most probable mode, and rem_intra_pred_mode indicates a syntax component of a mode number. One-bit prev_intra_pred_flag is first read from a bitstream during decoding, and an intra prediction mode is set as a most probable mode when prev_intra_pred_flag is 1, and proceeds to next syntax. Otherwise, 3-bit prev_intra_pred_flag is further read, and an intra prediction mode is set as a prediction mode of rem_intra_pred_mode.

Figure 2A:
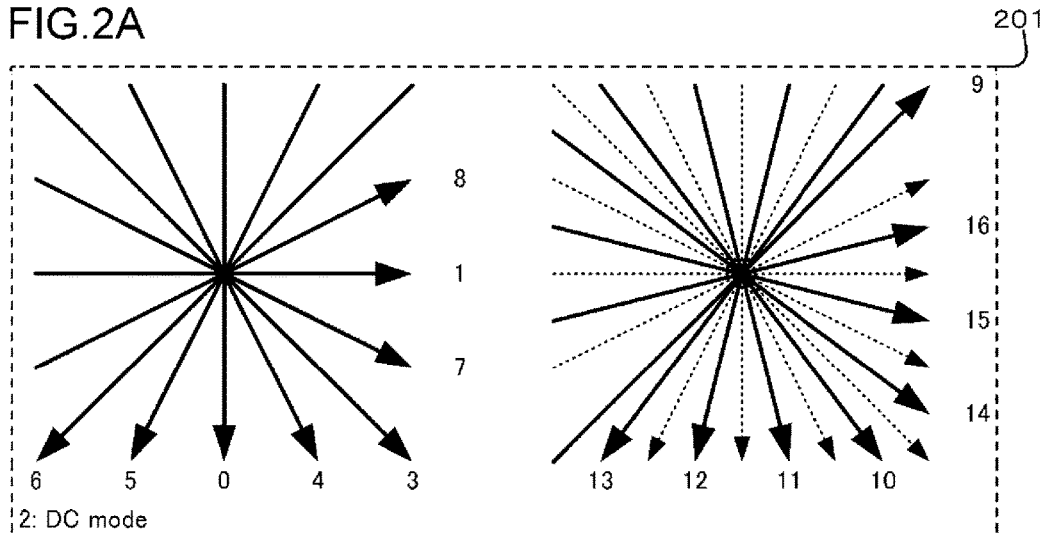
FIGS. 2A and 2B are diagrams for explaining prediction directions of 17 intra prediction mode patterns and 34 intra prediction mode patterns.
Figure 2B:
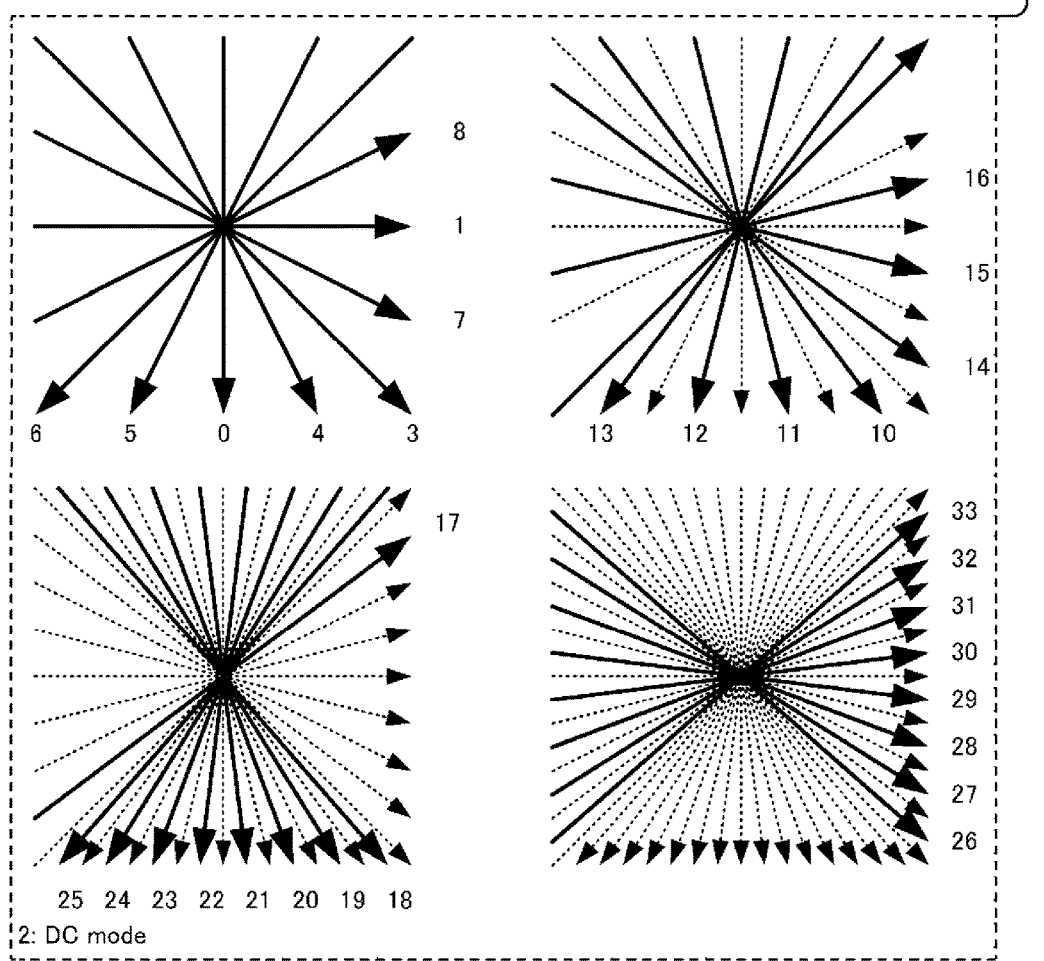

A similar transmitting method can be employed according to a coding tree indicated by reference numeral 303 in FIG. 3B in order to code 17 intra prediction mode patterns of FIGS. 2A and 2B.

[Most Probable Mode]

Processed neighboring blocks of a block to be processed are referred to in order to determine a most probable mode. The processed neighboring blocks are assumed as a block which is neighboring on the left of the block to be processed and at the uppermost side (which is called "reference block A") and a block which is neighboring on the upper side of the block to be processed and at the leftmost side (which is called "reference block B").

Exemplary processed neighboring reference blocks will be described with reference to FIG. 18. All the blocks (reference numerals 1802 to 1811) which are spatially positioned on the upper and/or left side to a block to be processed 1801 in the figure are processed, and other blocks (reference numerals 1812 to 1815) are not processed. The blocks neighboring on the left of the block to be processed 1801 are two blocks 1807 and 1809, and the block 1807 positioned on the upper side is assumed as reference block A. Only the block 1803 is neighboring on the upper side of the block to be processed 1801, and the block 1803 is assumed as reference block B.

Assuming the intra prediction mode numbers of the reference block A and the reference block B as modeIdxA and modeIdxB, respectively, an index mpmIDx of a most probable mode of the block to be processed is expressed in the following Equation.

mpmIdx=min(modeIdx$A$,modeIdx$B$)

That is, the most probable mode matches with either one of the intra prediction modes of the reference blocks.

[Relationship Between Most Probable Mode and Coding Tree]

A coding tree in FIG. 3A or 3B is directed for assigning a 1-bit code to a most probable mode and uniformly assigning a 1+3=4 bit code to other modes, and conforms to the following probability model.

$p$(mpm)≥0.5, where mpm indicates a most probable mode.

$p(m)$=0.0625=(1−$p$(mpm))/8, where $m$≠mpm.

However, according to the statistics of actual occurrence frequencies of intra prediction modes, an occurrence probability of the most probable mode is on average at p(mpm) =0.2, and the coding tree in FIG. 3A or 3B does not necessarily accord with an occurrence distribution of the actual intra prediction modes.

An expectation value bits$_{fact}$ of the average amount of occurred codes according to the occurrence probability of the most probable mode in the statistics when a coding tree in FIG. 3A or 3B is used is represented by bits$_{fact}$=3.4 (=0.2×1+0.8×4) (bits). On the other hand, an expectation value bits$_{opt}$ of the average amount of occurred codes when an optimum coding tree is designed assuming p(mpm)=0.2 is calculated to be bits$_{opt}$ 3.2 (bits), and thus the coding tree of FIG. 3A or 3B is found not optimum from the estimated average amount of occurred codes.

The above method is directed for setting a probability model based on a global occurrence probability of intra prediction modes matching with the intra prediction modes of the neighboring blocks. Actually, the occurrence distribution of intra prediction modes is different in each block, and a proper probability model can be assumed to be set respectively. However, the above method is directed for always setting the same probability model to all the blocks, and thus efficient coding is not performed.

In consideration of only the setting of a proper probability model, it is possible to derive the intra prediction modes of all the reference blocks and to set a different proper probability model for each combination of the modes. However, the number of combinations of prediction modes exponentially increases relative to the number of prediction modes, and thus the method is not a realistic solution due to its complicated processing.

The intra prediction is directed for duplicating a decoded sample value in a designated prediction direction, where all the frequency components in the prediction direction are lost while the frequency components in a direction orthogonal to the prediction direction are saved. Therefore, it is proper to select an intra prediction mode capable of reflecting as many frequency components as possible for a picture having characteristic frequency components. In other words, a correlation between a picture and an intra prediction mode may be present, and the following natures can be used for selecting an intra prediction mode.

(1) Intra prediction in a close prediction direction derives a similar prediction picture. When a target picture has a slight change, an intra prediction mode expressing a slight change is proper, and an intra prediction mode occurrence probability in a close direction is high.

(2) When prediction directions for intra prediction of neighboring blocks are close to each other, a picture correlation between the neighboring blocks is considered as high. At this time, the picture of the block to be processed is likely to have a high correlation with the neighboring blocks, and prediction directions of intra prediction of the block to be processed easily focus particularly in the peripheral directions of the prediction directions of the neighboring blocks.

(3) When prediction directions of intra prediction of neighboring blocks are away from each other, a picture correlation between the neighboring blocks is considered low. At this time, unlike when the prediction directions of intra prediction of the neighboring blocks are close to each other, a correlation between a block to be processed and a neighboring block tends to be low, and prediction directions of intra prediction of the block to be processed focus in the peripheral directions of the prediction directions of the neighboring blocks with difficulty.

In the present embodiment, in terms of the natures, a plurality of coding trees for probability models are prepared, a probability model is switched according to a prediction direction difference in intra prediction modes of the reference blocks, and a complicated coding processing along with the increase in coding trees is restricted, thereby achieving a reduction in the amount of occurred codes of the intra prediction modes and enhancing coding efficiency.

[Coding Device]

Figure 5:
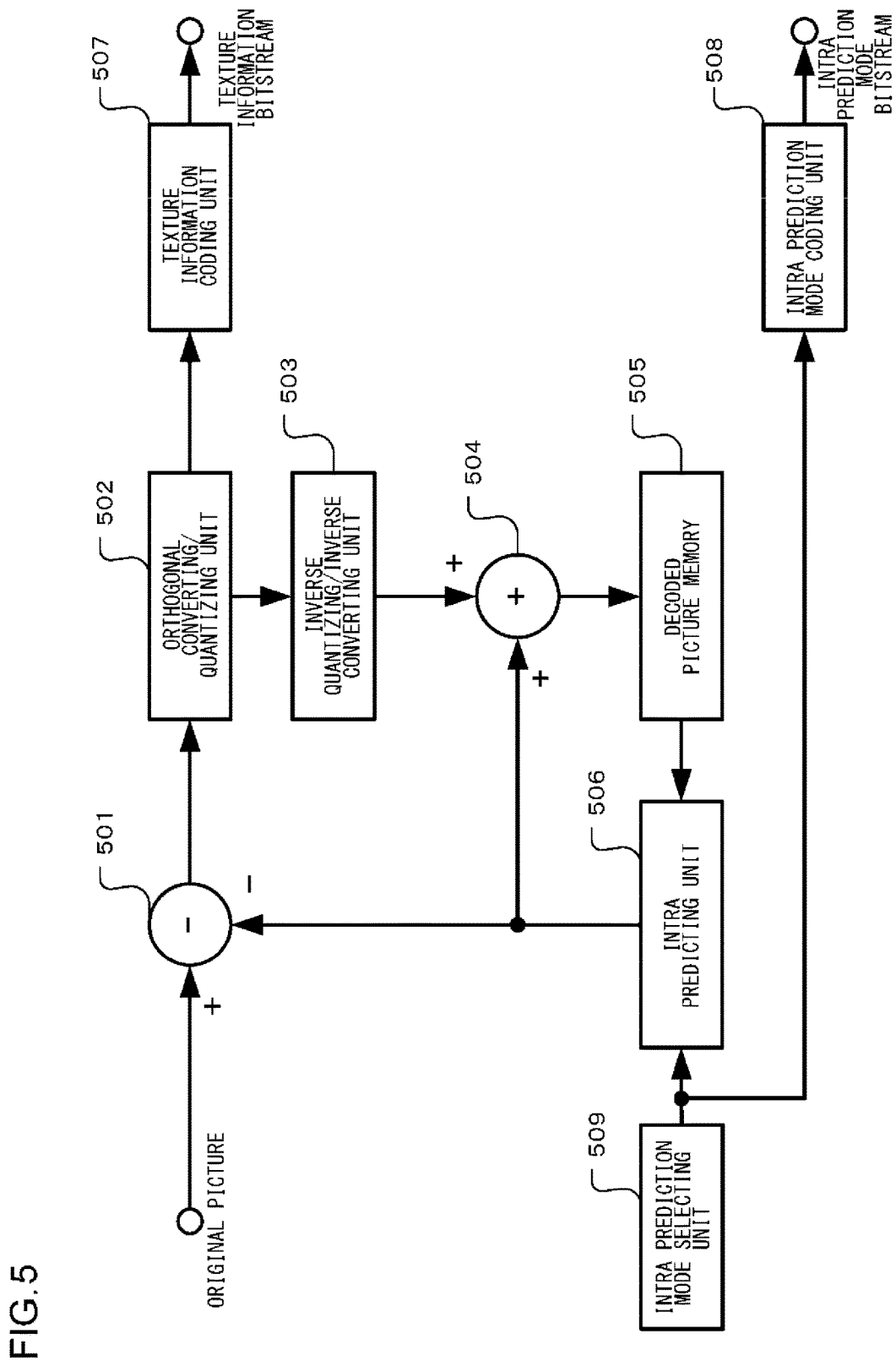
FIG. 5 is a block diagram illustrating a structure of a picture coding device for performing an intra prediction mode coding method according to an embodiment.

A picture coding device suitable for carrying out the present invention will be described with reference to the drawings. FIG. 5 is a block diagram illustrating a structure of a picture coding device according to the embodiment. The picture coding device according to the embodiment includes a subtracting unit 501, an orthogonal converting/quantizing unit 502, an inverse quantizing/inverse converting unit 503, an adding unit 504, a decoded picture memory 505, an intra predicting unit 506, a texture information coding unit 507, an intra prediction mode coding unit 508, and an intra prediction mode selecting unit 509. The embodiment of the present invention features intra prediction, and thus components for the inter prediction will not be illustrated and an explanation thereof will be omitted.

The intra prediction mode selecting unit 509 selects an optimum intra prediction mode per block of a picture, and gives the selected intra prediction mode to the intra predicting unit 506 and the intra prediction mode coding unit 508.

The intra prediction mode coding unit 508 performs variable length coding on the input intra prediction mode, and outputs an intra prediction mode bitstream. A detailed structure and operations of the intra prediction mode coding unit 508 will be described below.

The intra predicting unit 506 generates an intra prediction picture by use of the input intra prediction mode and decoded pictures of neighboring blocks stored in the decoded picture memory 505, and gives the generated intra prediction picture to the subtracting unit 501.

The subtracting unit 501 generates a differential picture by subtracting the intra prediction picture from an original picture to be coded, and gives the generated differential signal to the orthogonal converting/quantizing unit 502.

The orthogonal converting/quantizing unit 502 orthogonally converts/quantizes the differential picture to generate texture information, and gives the generated texture information to the inverse quantizing/inverse converting unit 503 and the texture information coding unit 507.

The texture information coding unit 507 entropy-codes the texture information, and outputs a texture information bitstream.

The inverse quantizing/inverse converting unit 503 performs inverse quantization/inverse orthogonal conversion on the texture information received from the orthogonal converting/quantizing unit 502 to generate a decoded differential signal, and gives the generated decoded differential signal to the adding unit 504.

The adding unit 504 adds the intra prediction picture and the decoded differential signal to generate a decoded picture, and stores the generated decoded picture in the decoded picture memory 505.

[Decoding Device]

Figure 8:
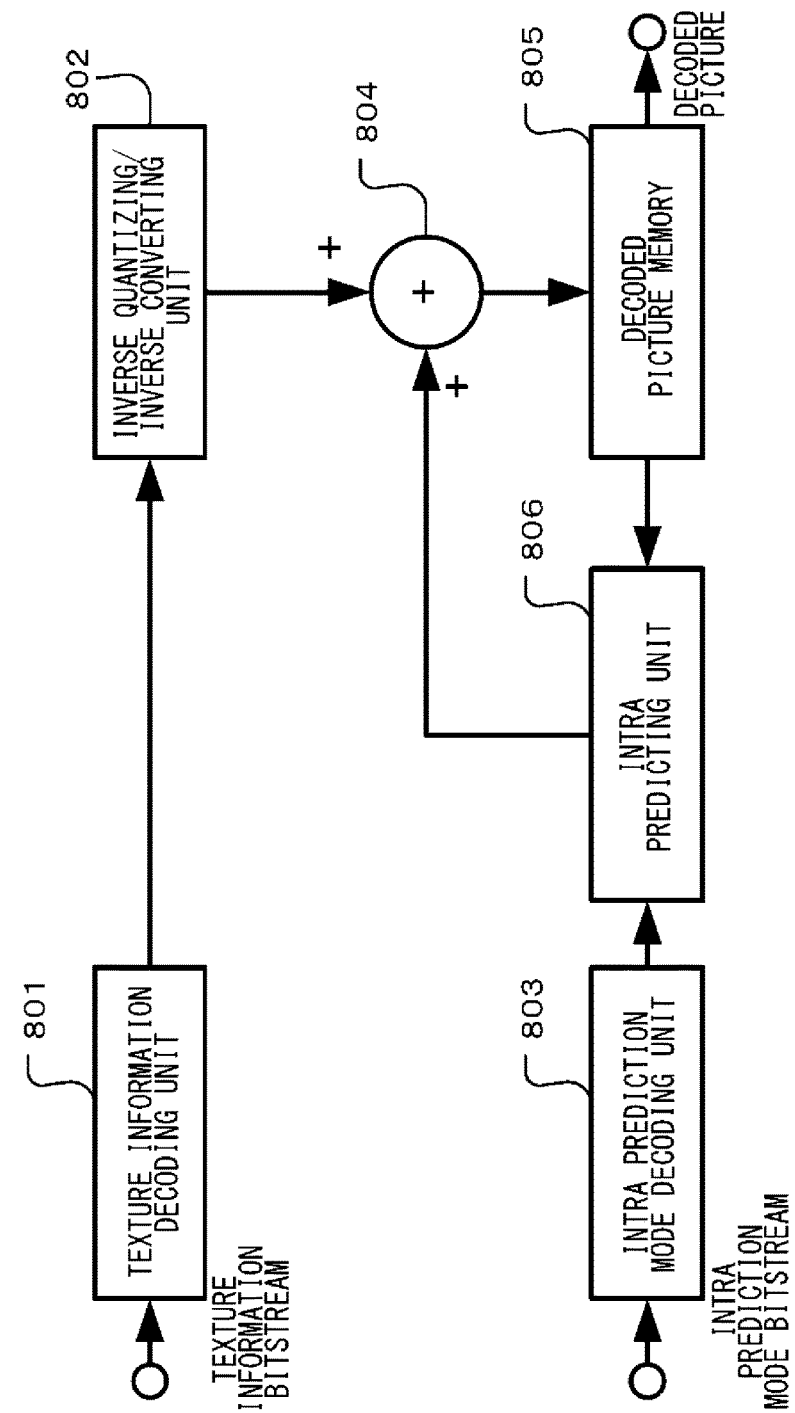
FIG. 8 is a block diagram illustrating a structure of a picture decoding device for performing an intra prediction mode decoding method according to the embodiment.

A picture decoding device suitable for carrying out the present invention will be described with reference to the drawings. FIG. 8 is a block diagram illustrating a structure of a picture decoding device according to the embodiment. The picture decoding device according to the embodiment includes a texture information decoding unit 801, an inverse quantizing/inverse converting unit 802, an intra prediction mode decoding unit 803, an adding unit 804, a decoded picture memory 805, and an intra predicting unit 806. The embodiment of the present invention features intra prediction, and thus components for the inter prediction will not be illustrated and an explanation thereof will be omitted.

A decoding processing by the picture decoding device of FIG. 8 corresponds to the decoding processing provided inside the picture coding device of FIG. 5, and thus the structures of the inverse quantizing/inverse converting unit 802, the adding unit 804, the decoded picture memory 805 and the intra predicting unit 806 in FIG. 8 have the functions corresponding to the structures of the inverse quantizing/inverse converting unit 503, the adding unit 504, the decoded picture memory 505, and the intra predicting unit 506 in the picture coding device of FIG. 5, respectively.

The intra prediction mode decoding unit 803 entropy-decodes the input intra prediction mode bitstream to generate an intra prediction mode, and gives the generated intra prediction mode to the intra predicting unit 806. A detailed structure and operations of the intra prediction mode decoding unit 803 will be described below.

The intra predicting unit 806 generates an intra prediction picture by use of the input intra prediction mode and decoded pictures of neighboring blocks stored in the decoded picture memory 805, and gives the generated intra prediction picture to the adding unit 804.

The texture information decoding unit 801 entropy-decodes texture information to generate texture information. The generated texture information is given to the inverse quantizing/inverse converting unit 802.

The inverse quantizing/inverse converting unit 802 performs inverse quantization/inverse orthogonal conversion on the texture information received from the texture information decoding unit 801 to generate a decoded differential signal, and gives the generated decoded differential signal to the adding unit 804.

The adding unit 804 adds the intra prediction picture and the decoded differential signal to generate a decoded picture, and stores and outputs the generated decoded picture in the decoded picture memory 805.

The intra prediction mode coding and decoding processing according to the embodiment of the present invention are performed in the intra prediction mode coding unit 508 in the moving picture coding device of FIG. 5 and the intra prediction mode decoding unit 803 in the moving picture decoding device of FIG. 8, respectively. Details of the intra prediction mode coding and decoding processing according to the embodiment will be described below.

[Coding Block]

Figure 18:
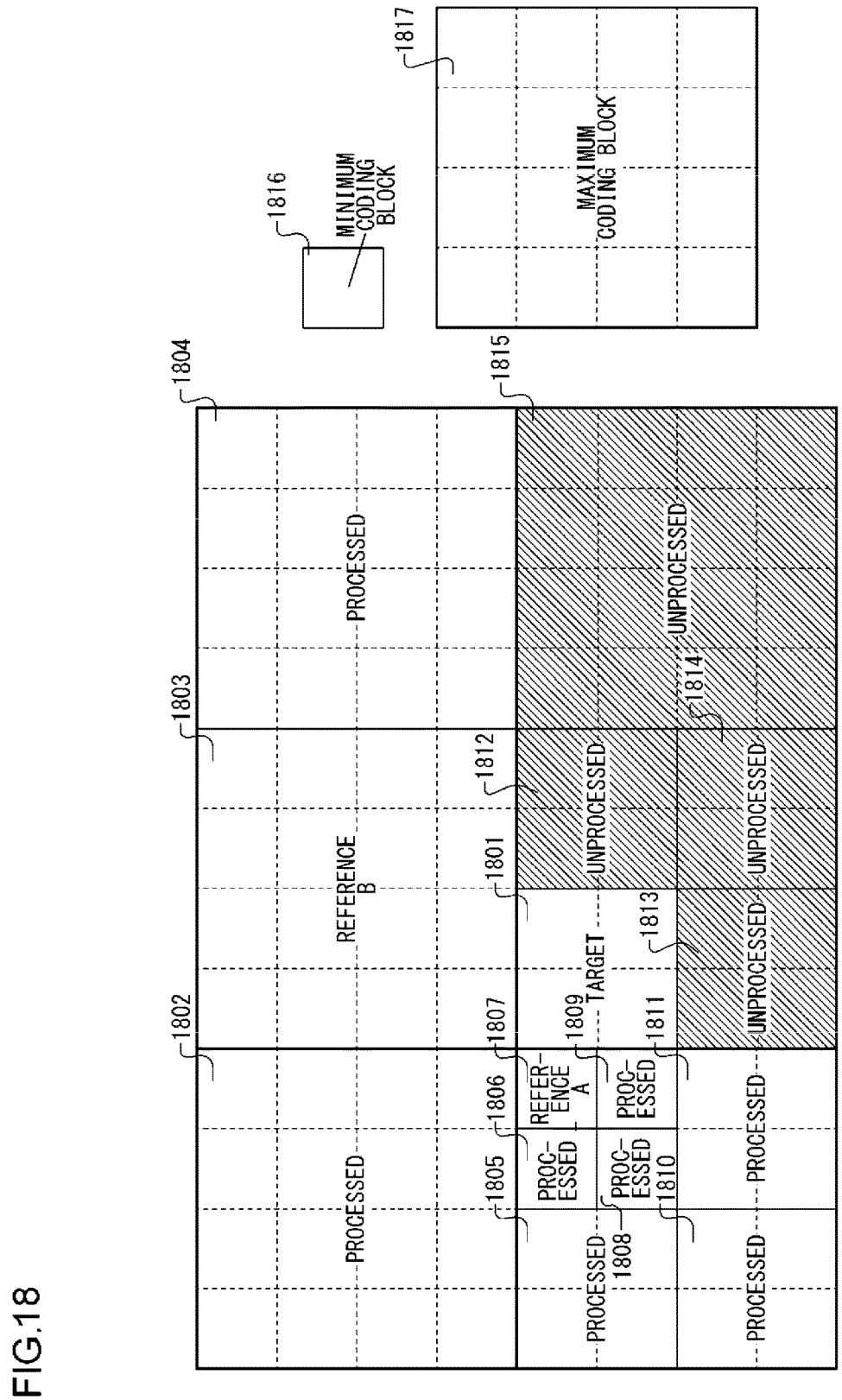
FIG. 18 is a diagram for explaining a block structure and reference blocks of a picture.

In the embodiment, as illustrated in FIG. 18, a screen is partitioned into rectangular blocks in a hierarchical manner and a processing is sequentially performed on each block in a predetermined processing order. Each block to be partitioned is called coding block. The block 1817 in FIG. 18 is a maximum unit of partition in the embodiment, and is called maximum coding block. The block 1816 in FIG. 18 is a minimum unit of partition in the embodiment, and is called minimum coding block. An explanation will be made below assuming the minimum coding block as 4×4 pixels and the maximum coding block as 16×16 pixels.

[Prediction Block]

A unit of intra prediction in coding blocks is called prediction block. The prediction block has any size larger than or equal to the minimum coding block or smaller than or equal to the maximum coding block. In FIG. 18, the blocks 1802, 1803 and 1804 are 16×16 blocks, the blocks 1805, 1810, 1811 and 1801 are 8×8 blocks, and the blocks 1806, 1807, 1808 and 1809 are 4×4 blocks. The blocks 1812, 1813, 1814, and 1815 are unprocessed blocks, and their coding block sizes are not defined. In the coding processing, an optimum prediction block size is determined and the prediction block size is transmitted. In the decoding procedure, a prediction block size is derived from a bitstream. An explanation will be made below assuming a prediction block as a processing unit.

[Prediction Block Size and Intra Prediction Mode]

A structure of an intra prediction mode is switched depending on a prediction block size. 17 intra prediction mode patterns indicated in reference numeral 201 in FIG. 2A are defined for 4×4 block, and 34 intra prediction mode patterns indicated in reference numeral 202 in FIG. 2B are defined for 8×8 block and 16×16 block. This is because even if an excessive number of intra prediction mode patterns are defined for a small-size prediction block, quality for an increase in occurred codes cannot be obtained.

[Reference Block and Reference Intra Prediction Mode]

The reference blocks include a block A which is neighboring on the left of a block to be processed and at the uppermost side and a block B which is neighboring on the upper side of the block to be processed and at the leftmost side. A prediction mode of the block A is assumed as refModeA and a prediction mode of the block B is assumed as refModeB. An intra prediction mode of each reference block is called "reference intra prediction mode." The reference intra prediction mode when a reference block is not present is set at a DC prediction mode (which may be called "average value mode").

First Example

[Coding Procedure]

Figure 6:
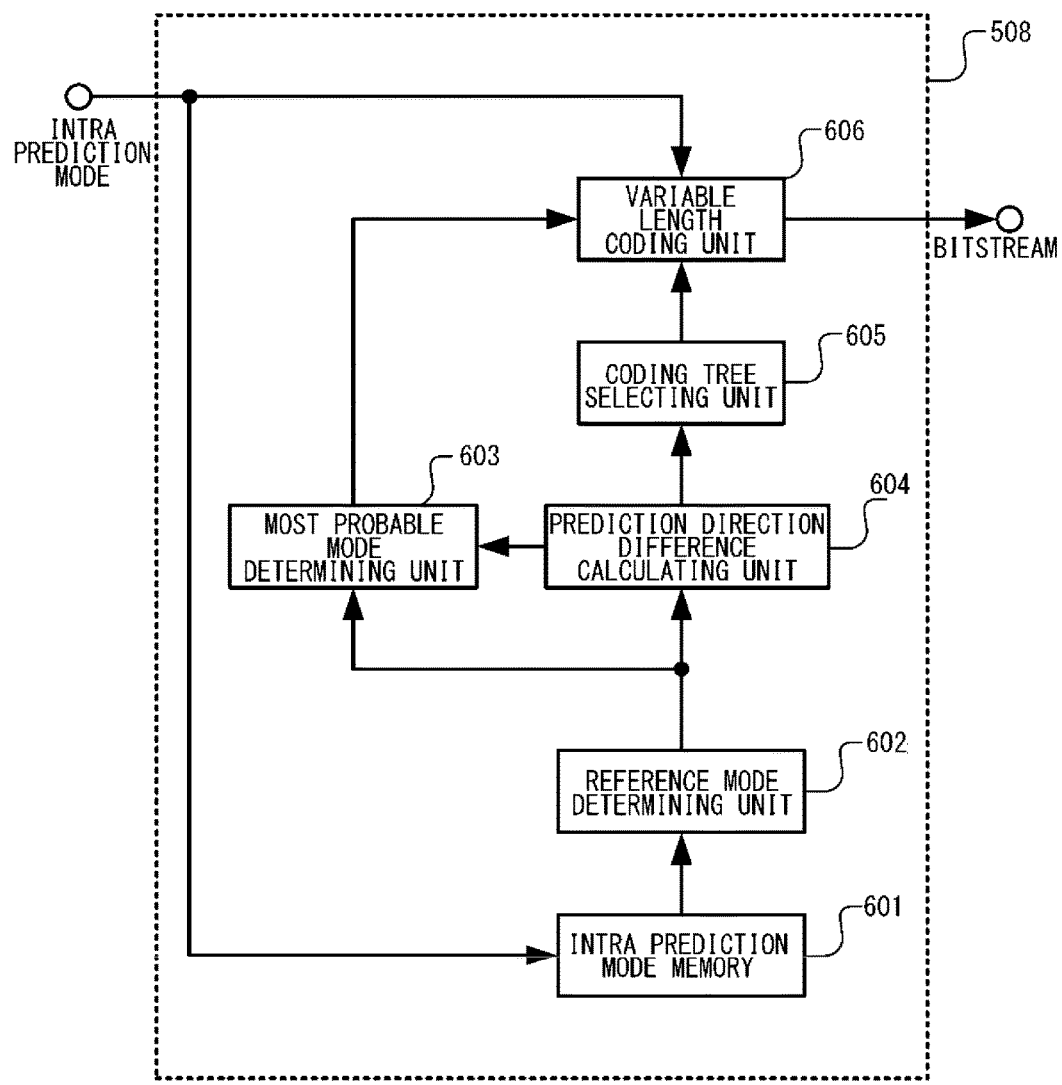
FIG. 6 is a block diagram illustrating a detailed structure of a first example of an intra prediction mode coding unit of FIG. 5.

A first example of the intra prediction mode coding method according to the embodiment of the present invention will be described. FIG. 6 is a block diagram of a detailed structure of the first example of the intra prediction mode coding unit 508 of FIG. 5. The intra prediction mode coding unit 508 according to the first example includes an intra prediction mode memory 601, a reference mode determining unit 602, a most probable mode determining unit 603, a prediction direction difference calculating unit 604, a coding tree selecting unit 605, and a variable length coding unit 606. The intra prediction mode coding procedure will be described below with reference to the flowchart of FIG. 7.

An intra prediction mode to be input from the intra prediction mode selecting unit 509 is saved and stored in the intra prediction mode memory 601.

The reference mode determining unit 602 derives an intra prediction mode of a coded reference block neighboring to a block to be coded from the intra prediction mode memory 601, and determines a reference intra prediction mode (step S701). The reference intra prediction mode determining procedure will be described below in detail.

The prediction direction difference calculating unit 604 derives a reference intra prediction mode from the reference mode determining unit 602, and calculates a prediction direction difference (step S702). The prediction direction difference calculating procedure will be described below in detail.

The most probable mode determining unit 603 derives a prediction direction difference from the prediction direction difference calculating unit 604, and derives a reference intra prediction mode from the reference mode determining unit 602. The most probable mode determining unit 603 determines a most probable mode based on the derived prediction direction difference and reference intra prediction mode (step S703). The most probable mode determining procedure will be described below in detail.

The coding tree selecting unit 605 derives a prediction direction difference from the prediction direction difference calculating unit 604, and determines a coding tree depending on the prediction direction difference (step S704). The coding tree selecting procedure will be described below in detail.

The intra prediction mode of the block to be coded is input to the variable length coding unit 606, and the variable length coding unit 606 derives a most probable mode from the most probable mode determining unit 603, and a coding tree from the coding tree selecting unit 605. The variable length coding unit 606 performs variable length coding on the intra prediction mode of the block to be coded by use of the most probable mode and the coding tree (step S705). The variable length coding unit 606 outputs the generated bitstream, and terminates a series of intra prediction mode coding processing.

[Reference Intra Prediction Mode Determining Procedure]

Figure 7:
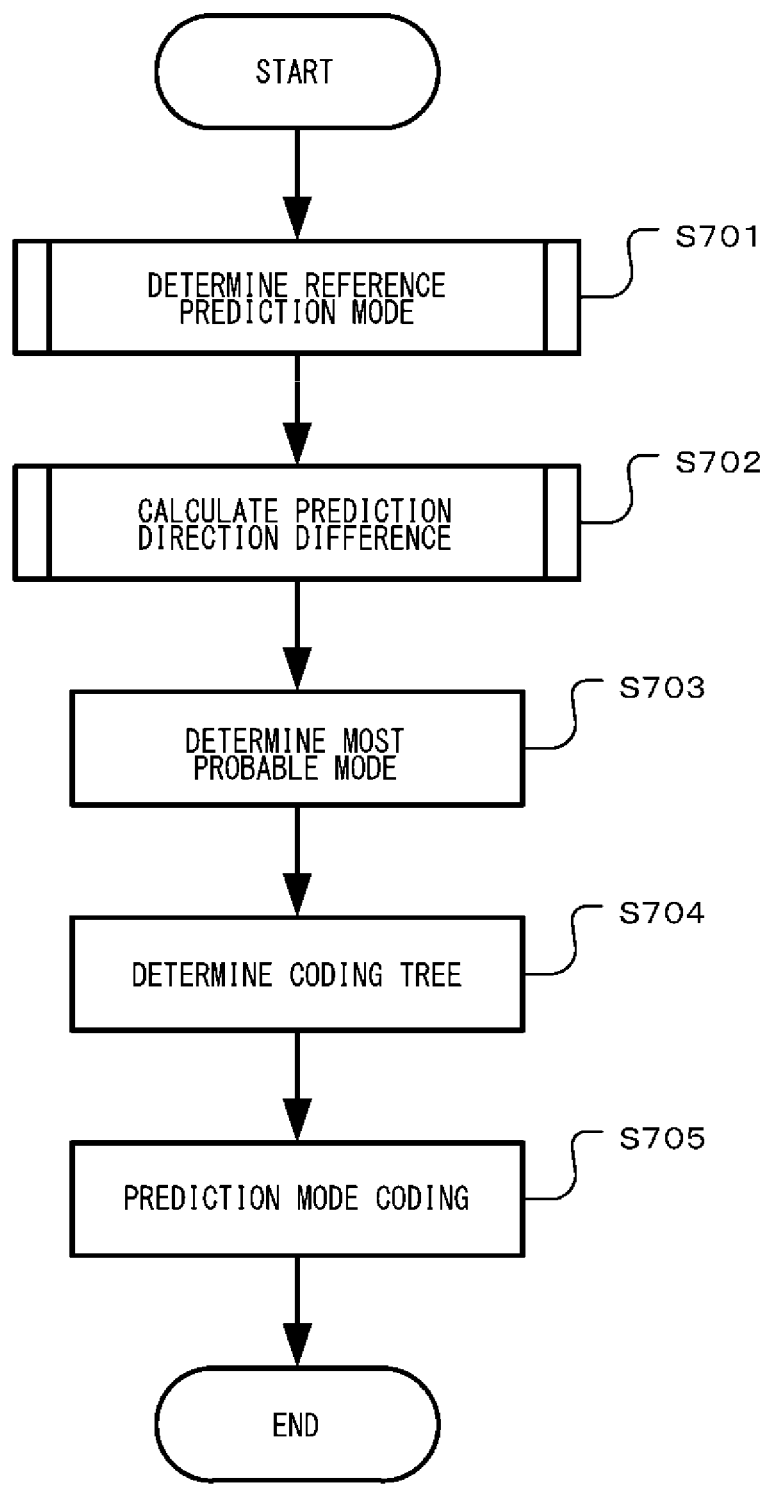
FIG. 7 is a flowchart for explaining an intra prediction mode coding procedure by the intra prediction mode coding unit of FIG. 6.
Figure 11:
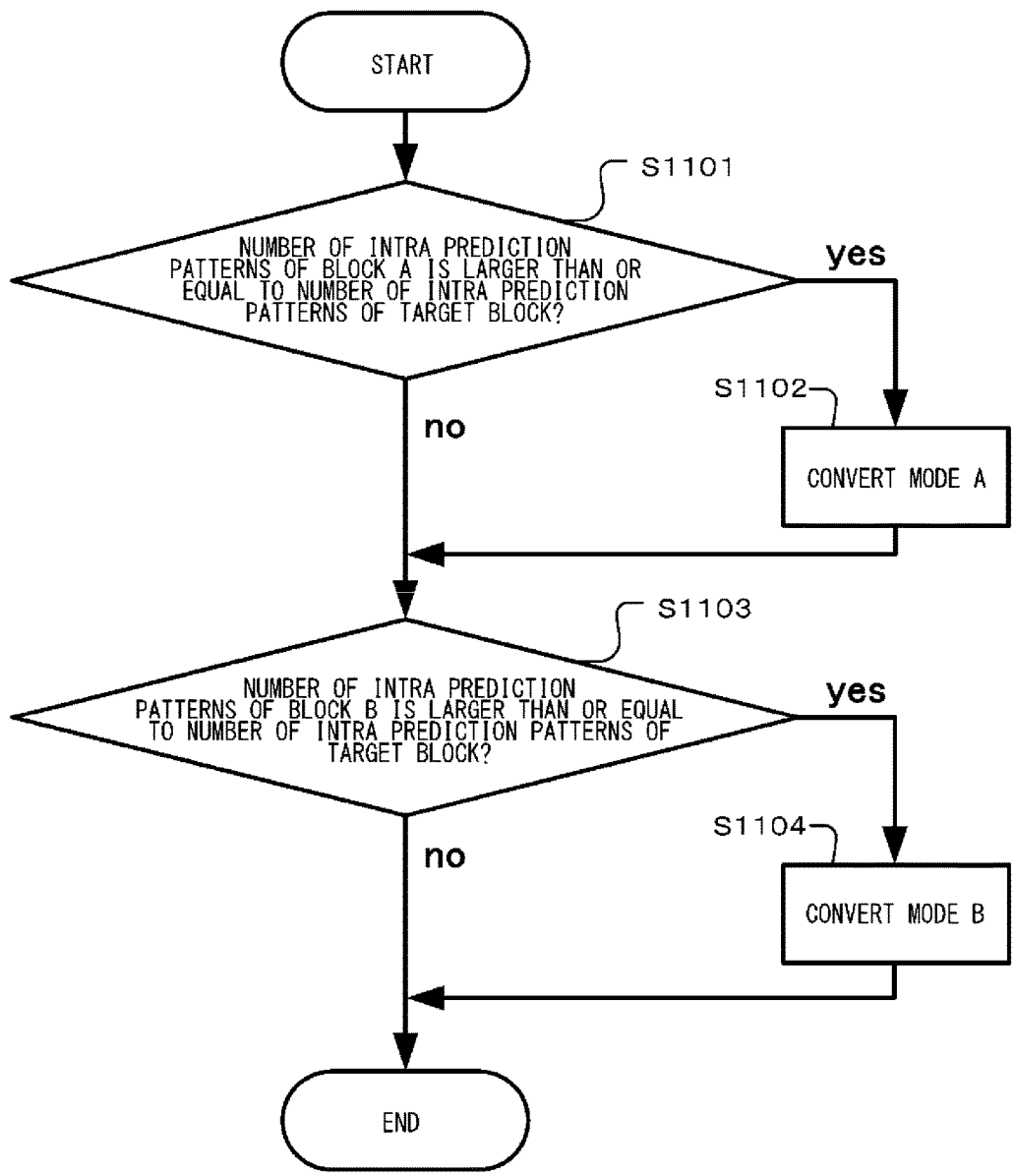
FIG. 11 is a flowchart for explaining a procedure of determining a reference intra prediction mode according to the embodiment.

The reference intra prediction mode determining procedure in step S701 in FIG. 7 will be described in detail with reference to the flowchart of FIG. 11.

The reference mode determining unit 602 in FIG. 6 derives an intra prediction mode of a reference block neighboring to the block to be coded from the intra prediction mode memory 601.

The number of intra prediction mode patterns of the reference block A neighboring on the left of the block to be coded is compared with the number of intra prediction mode patterns of the block to be coded (step S1101).

When the number of intra prediction mode patterns of the block to be coded is larger than or equal to the number of intra prediction mode patterns of the reference block A, the intra prediction modes of the reference block A remain "reference mode A" (step S1102).

When the number of intra prediction mode patterns of the block to be coded is smaller than the number of intra prediction mode patterns of the reference block A, the reference modes are converted (step S1103). The reference mode conversion will be described below.

The number of intra prediction modes of the reference block B neighboring on the upper side of the block to be coded is compared with the number of intra prediction mode patterns of the block to be coded (step S1104).

When the number of intra prediction mode patterns of the block to be coded is larger than or equal to the number of intra prediction mode patterns of the reference block B, the intra prediction modes of the reference block B remain "reference mode B" (step S1105).

When the number of intra prediction mode patterns of the block to be coded is smaller than the number of intra prediction mode patterns of the reference block B, the reference modes are converted (step S1106).

Figure 19:
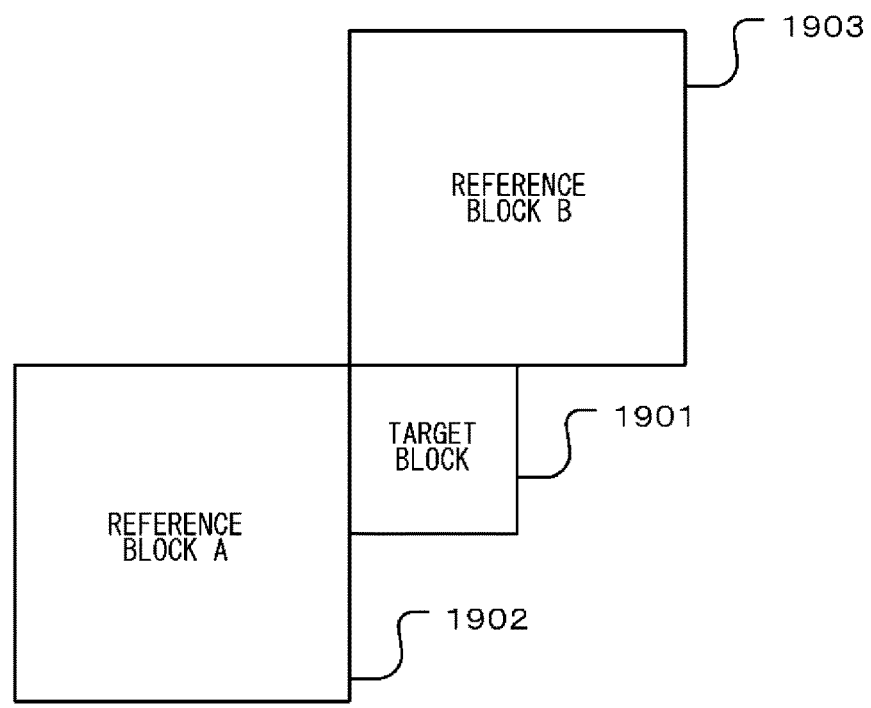
FIG. 19 is a diagram for explaining a relationship between a block to be processed and reference blocks.

The reference mode conversion will be described. As illustrated in FIG. 19, the reference mode conversion is performed when the sizes of the reference block A1902 and the reference block B1901 are larger than that of the block to be coded 1901. Herein, the block to be coded 1901 is a 4×4 pixel block, and the reference block A1902 and the reference block B1903 are 8×8 pixel blocks. 17 intra prediction mode patterns indicated in reference numeral 201 in FIG. 2A are defined for the block to be coded 1901. 34 intra prediction mode patterns indicated in reference numeral 202 in FIG. 2B are defined for the reference block A1902 and the reference block B1903.

In this way, when the number of intra prediction mode patterns of the block to be coded is smaller than the number of intra prediction mode patterns of the reference block, the intra prediction mode patterns of the reference block need to be reduced to the intra prediction mode patterns of the block to be coded in any manner in order to code the intra prediction mode patterns of the block to be coded. The reference mode conversion is a processing of converting many intra prediction mode patterns of the reference block into less intra prediction mode patterns of the block to be coded.

Figure 15:
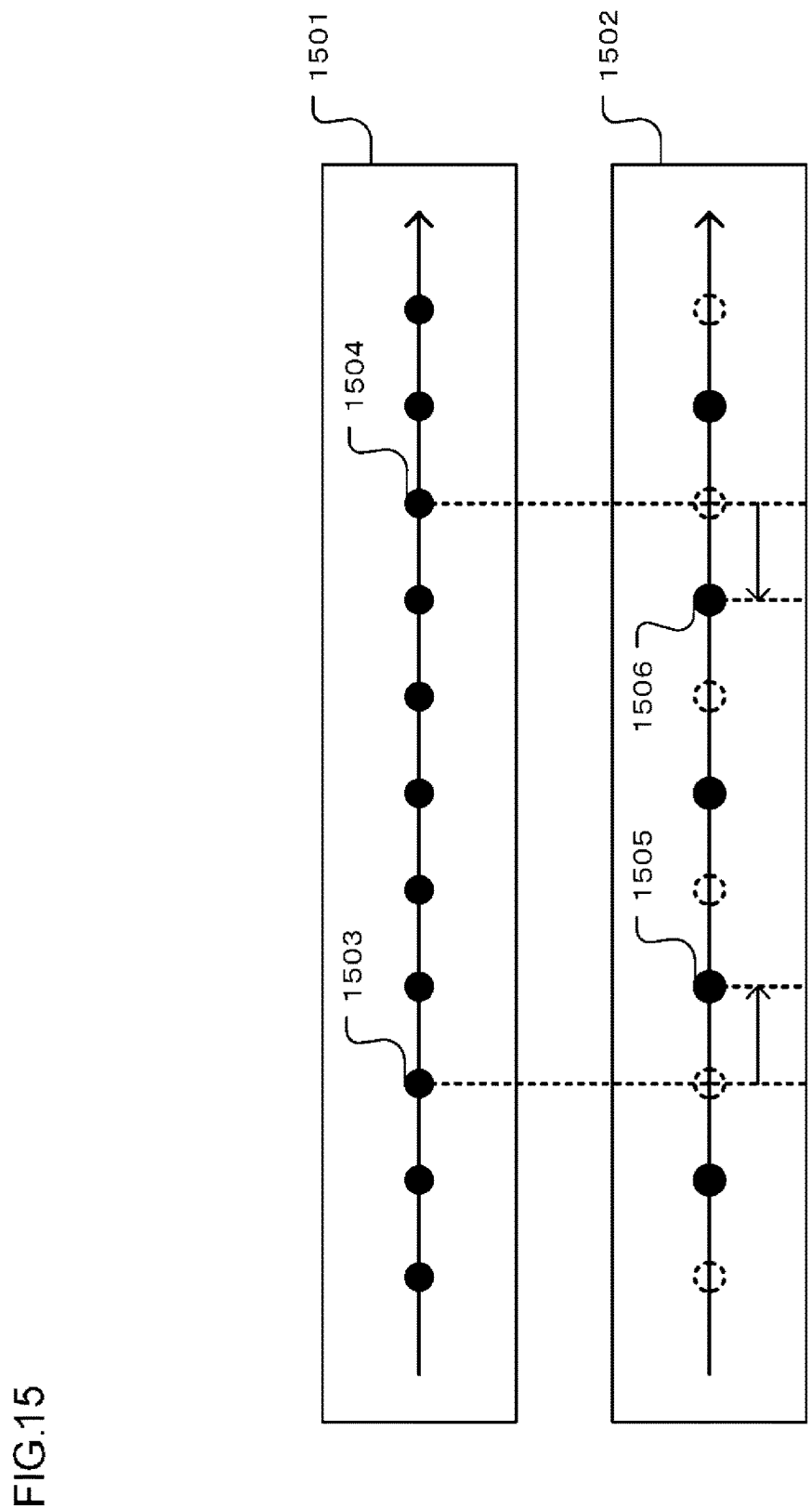
FIG. 15 is a diagram for explaining a processing of converting a prediction direction of an intra prediction mode.

The intra prediction mode converting processing will be described with reference to FIG. 15. Reference numeral 1501 in FIG. 15 indicates prediction directions of 34 intra prediction mode patterns on the horizontal axis. Reference numeral 1502 in FIG. 15 indicates prediction directions of 17 intra prediction mode patterns on the horizontal axis. The points indicated in the dashed line of reference numeral 1502 in FIG. 15 are the prediction directions contained in the 34 intra prediction mode patterns but not contained in the 17 intra prediction mode patterns.

In the 34 intra prediction mode patterns indicated in reference numeral 1501, the prediction direction of the reference mode A is indicated in reference numeral 1503 and the prediction direction of the reference mode B is indicated in reference numeral 1504. At this time, in the 17 intra prediction mode patterns indicated in reference numeral 1502, a prediction mode is not present at the points (points indicated in the dashed line) corresponding to the prediction directions of the reference modes A and B. Thus, in the 17 intra prediction mode patterns, the points (reference numerals 1505 and 1506) neighboring to the points corresponding to the prediction directions of the reference modes A and B are selected as converted prediction modes.

[Prediction Direction Difference Calculating Procedure]

Figure 12:
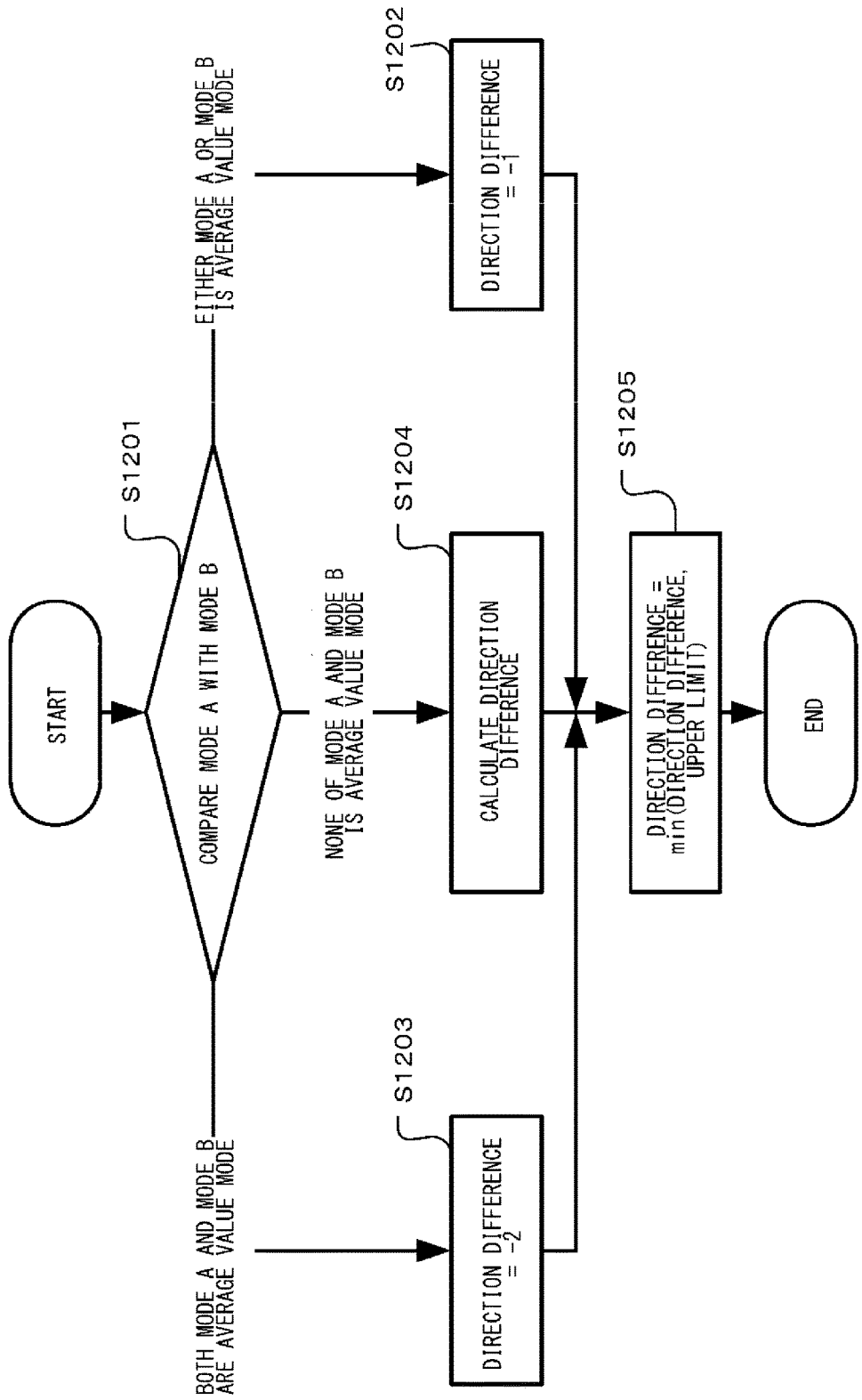
FIG. 12 is a flowchart for explaining a procedure of calculating a prediction direction difference according to the embodiment.

The prediction direction difference calculating procedure in step S702 in FIG. 7 will be described in detail with reference to the flowchart of FIG. 12.

The prediction direction difference calculating unit 604 derives the reference modes A and B from the reference mode determining unit 602, and compares the reference mode A with the reference mode B (step S1201).

When both the reference modes A and B are an average value mode, a special value-2 indicating that both modes are an average value mode is set as a prediction direction difference (step S1202).

When either one of the reference modes A and B is an average value mode, a special value-1 indicating that either is an average value mode is set (step S1203).

When none of the reference modes A and B is an average value mode, prediction direction numbers are determined for the reference modes A and B, respectively, with reference to the table in which a prediction mode is associated with a prediction direction number in FIG. 13.

FIG. 13 is a table in which an intra prediction mode number is associated with a prediction direction number. The intra prediction mode number is not given in order of directions unlike in FIGS. 1A and 1B or FIGS. 2A and 2B, and thus cannot be used for calculating a prediction direction difference. A table in which a prediction direction number given in order of directions is associated with a prediction mode number is prepared, and a prediction direction number is used for calculating a prediction direction difference.

Assuming the prediction direction numbers of the reference mode A and the reference mode B as dirA and dirB, respectively, a prediction direction difference DiffDir indicating a degree of difference in prediction directions of the reference mode A and the reference mode B is calculated in the following calculation equation (step S1204).

$$DiffDir=min(16-abs(dirA-dirB),abs(dirA-dirB))$$

where, abs( ) is a function for calculating the absolute value of an argument, and min( ) is a function for selecting the minimum values of two arguments.

Then, the prediction direction difference DiffDir is compared with a predetermined upper limit, and if the prediction direction difference DiffDir exceeds the upper limit, the prediction direction difference DiffDir is replaced with the upper limit (step S1205). In the 17 intra prediction mode patterns, the maximum value of the prediction direction difference is set at 8 and the upper limit value is set at 4, for example, and when the prediction direction difference exceeds 4, it is rounded to 4.

[Most Probable Mode Determining Procedure]

The most probable mode determining procedure in step S703 in FIG. 7 will be described in detail.

The most probable mode determining unit 603 derives a prediction direction difference from the prediction direction difference calculating unit 604, and derives a reference mode from the reference mode determining unit 602. The most probable mode determining unit 603 determines the number of most probable modes and mode numbers of the most probable modes with reference to a table in which a most probable mode and a coding tree are associated with a prediction direction difference in FIG. 14.

FIG. 14 indicates that the number of most probable modes, a most probable mode number and a coding tree number are associated with a prediction direction difference. FIG. 14 indicates a case in which the 17 intra prediction mode patterns are used, where the prediction direction difference takes a value between 0 and 8 and a special value-1 or -2. As the prediction direction difference is larger, the number of most probable modes is larger. In order to increase the number of most probable modes, modes neighboring to the reference modes A and B, or an average value mode is used as the most probable mode in addition to the reference modes A and B.

A most probable mode for each prediction direction difference will be described below by use of the example in FIGS. 16A-16C.

[Prediction Direction Difference of 0]

It is assumed that the reference mode A and the reference mode B, none of which is an average value mode, may match in their prediction directions. In this case, the table in FIG. 14 indicates that the number of most probable modes is three, where the first most probable mode is the same mode as the reference mode A and the reference mode B, and the second most probable mode and the third most probable mode are the prediction modes in the directions neighboring to the first most probable mode. Reference numeral 1601 in FIG. 16A indicates a conceptual diagram of the most probable modes when the prediction direction difference is 0. The prediction direction of the first most probable mode is the point in reference numeral 1602, the prediction direction of the second most probable mode is the point in reference numeral 1603, and the prediction direction of the third most probable mode is the point in reference numeral 1604, which are neighboring to each other.

[Prediction Direction Difference of 1]

The prediction direction of the reference mode A and the prediction direction of the reference mode B are neighboring to each other. In this case, the table in FIG. 14 indicates that the number of most probable modes is four, where the first most probable mode is the reference mode A, the second most probable mode is the reference mode B, and the third most probable mode and the fourth most probable mode are the prediction modes in the directions neighboring to the first most probable mode and the second most probable mode, respectively. Reference numeral 1605 in FIG. 16B indicates a conceptual diagram of the most probable modes when the prediction direction difference is 1. The prediction directions of the first most probable mode, the second most probable mode, the third most probable mode and the fourth most probable mode are indicated in reference numeral 1606, reference numeral 1607, reference numeral 1608, and reference numeral 1609, respectively.

[Prediction Direction Difference of 2]

Another prediction direction between the prediction direction of the reference mode A and the prediction direction of the reference mode B may be present. In this case, the table in FIG. 14 indicates that the number of most probable modes is five, where the first most probable mode is the reference mode A, the second most probable mode is the reference mode B, the third most probable mode is a prediction mode indicating a prediction direction between the first most probable mode and the second most probable mode, and the fourth most probable mode and the fifth most probable mode are prediction modes in the prediction directions which are neighboring to the first most probable mode and the second most probable mode, respectively, and are not the third most probable mode. Reference numeral 1610 in FIG. 16C indicates a conceptual diagram of the most probable modes when the prediction direction difference is 2. The prediction directions of the first most probable mode, the second most probable mode, the third most probable mode, the fourth most probable mode and the fifth most probable mode are indicated in reference numeral 1611, reference numeral 1612, reference numeral 1613, reference numeral 1614, and reference numeral 1615, respectively.

[Prediction Direction Difference of 3 or More]

A case where the prediction direction difference is larger than or equal to 3 conforms to the same procedure, and thus an explanation thereof will be omitted.

[Prediction Direction Difference of −2 (Both Reference Modes are Average Value Mode)]

It is assumed that both the reference mode A and the reference mode B are an average value mode. In this case, the table in FIG. 14 indicates that the number of most probable modes is one, where the first most probable mode is assumed as an average value mode.

[Prediction Direction Difference of −1 (Either One of Reference Modes is Average Value Mode)]

It is assumed that either the reference mode A or the reference mode B is an average value mode. In this case, the table in FIG. 14 indicates that the number of most probable modes is four, where the first most probable mode is the reference mode A, the second most probable mode is the reference mode B, and the third most probable mode and the fourth most probable mode are prediction modes neighboring to the prediction direction of the first most probable mode or the second most probable mode which is not the average value mode.

[Coding Tree Selecting Procedure]

The coding tree selecting procedure in step S704 in FIG. 7 will be described in detail. 17 intra prediction mode patterns are assumed herein.

The coding tree selecting unit 605 derives a prediction direction difference from the prediction direction difference calculating unit 604. A coding tree is selected with reference to the table in FIG. 14. In the table of FIG. 14, a coding tree number is associated with the number of most probable modes.

Figure 17A:
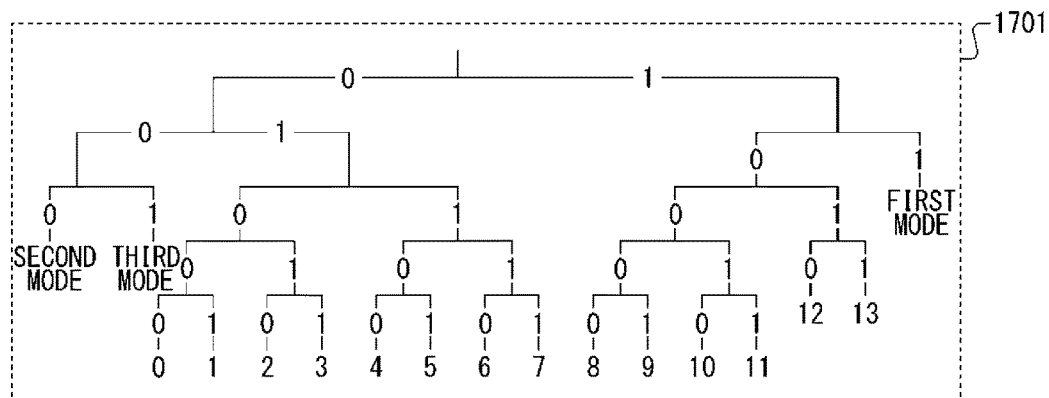
FIGS. 17A-17C are diagrams for explaining coding trees used in the embodiment.
Figure 17B:
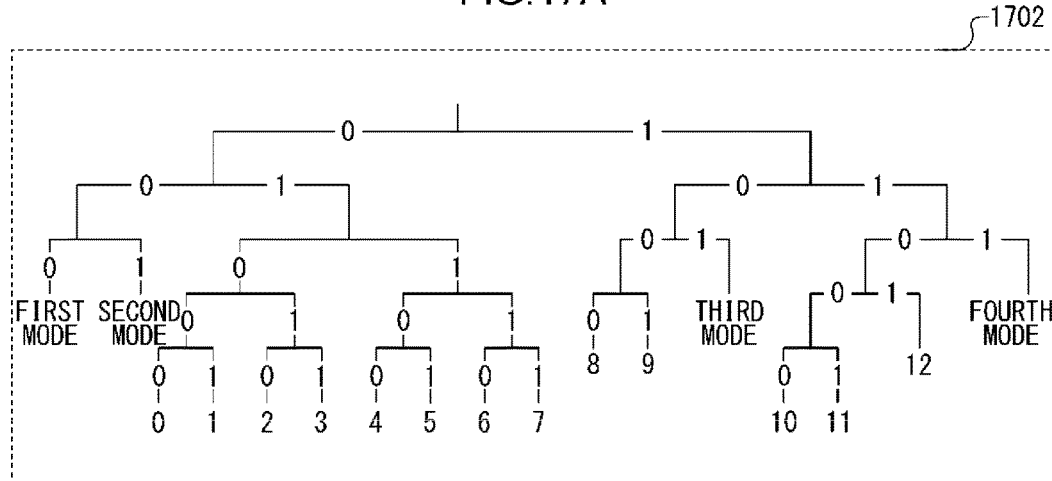
Figure 17C:
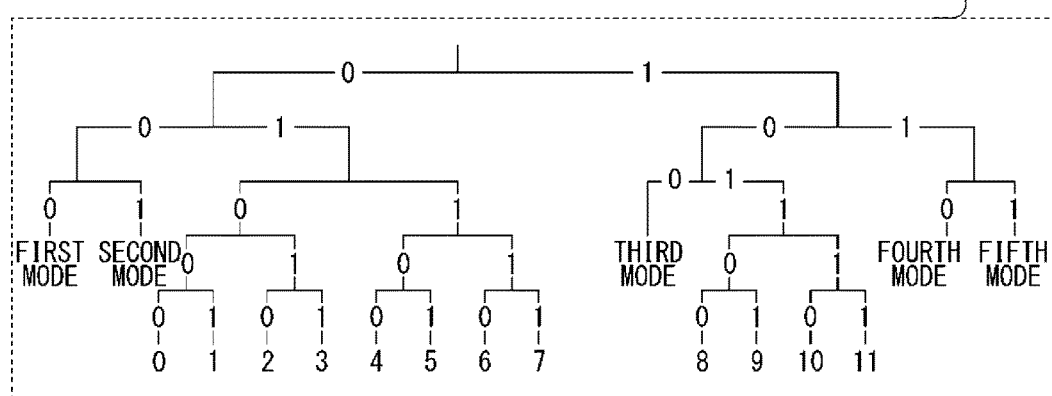

FIGS. 17A-17C illustrate exemplary coding trees. Reference numeral 1701 indicates a coding tree with a coding tree number 0 (which will be called "coding tree 0"), reference numeral 1702 indicates a coding tree with a coding tree number 1 (which will be called "coding tree 1"), and reference numeral 1703 is a coding tree with a coding tree number 2 (which will be called "coding tree 2"). Other coding trees will be omitted. Each coding tree is classified into either a leaf indicating a most probable mode or a leaf indicating a prediction mode number, and a most probable mode determined in the most probable mode determining procedure is adaptively assigned to a leaf indicating a most probable mode. On the other hand, a prediction mode number of a prediction mode to be processed (is converted except the most probable modes) is fixedly assigned to a leaf indicating a prediction mode number. A bitstream with a shorter code length than other prediction modes is assigned to a most probable mode in any coding tree, and thus if an intra prediction mode of a block to be coded corresponds to any most probable mode, the amount of occurred codes is reduced.

The selection of a coding tree depending on a prediction direction difference will be described below with reference to FIGS. 17A-17C.

[Prediction Direction Difference of 0]

A coding tree 0 is selected with reference to FIG. 14. The coding tree 0 is set as a three-leaf most probable mode. According to the most probable mode determining procedure, the first most probable mode is the same mode as the reference mode A and the reference mode B, and the second most probable mode and the third most probable mode are prediction modes of the prediction directions neighboring to the first most probable mode, respectively.

[Prediction Direction Difference of 1]

A coding tree 1 is selected with reference to FIG. 14. The coding tree 1 is set as a four-leaf most probable mode. According to the most probable mode determining procedure, the first most probable mode is the reference mode A, the second most probable mode is the reference mode B, and the third most probable mode and the fourth most probable mode are prediction modes neighboring to the first most probable mode and the second most probable mode, respectively.

[Prediction Direction Difference of 2]

A coding tree 2 is selected with reference to FIG. 14. The coding tree 2 is set as a five-leaf most probable mode. According to the most probable mode determining procedure, the first most probable mode is the reference mode A, the second most probable mode is the reference mode B, the third most probable mode is a prediction mode indicating a prediction direction between the first most probable mode and the second most probable mode, and the fourth most probable mode and the fifth most probable mode are prediction modes in the prediction directions which are neighboring to the first most probable mode and the second most probable mode and are not the third most probable mode.

[Prediction Direction Difference of 3 or More]

The case conforms to the same procedure, and thus an explanation thereof will be omitted.

[Prediction Direction Difference of −2]

A coding tree 9 is selected with reference to FIG. 14.

[Prediction Direction Difference of −1]

A coding tree 10 is selected with reference to FIG. 14.

As described above, the picture coding device according to the present embodiment uses a prediction mode indicating a direction neighboring to the prediction direction of an intra prediction mode of a reference block as a most probable mode, in addition to the intra prediction mode of the reference block. Coding trees with different numbers of most probable modes are prepared, and a coding tree is switched based on a prediction direction difference in intra prediction modes of the reference blocks, thereby enhancing coding efficiency of the intra prediction mode of the block to be coded.

As the prediction direction difference is smaller, a coding tree with less most probable modes is selected, and a coding tree assigned with a bit stream having a shorter code length than other prediction modes for the most probable mode is used to code the intra prediction mode of the block to be coded.

When a plurality of reference blocks indicate mutually-close prediction directions, a picture correlation between the reference blocks is high and a picture correlation between the block to be processed and the reference block is likely to be high. At this time, the prediction directions of the blocks to be processed easily focus near the prediction directions of the reference blocks. On the other hand, when the prediction directions of the reference blocks are far away from each other, a picture correlation between the reference blocks is low, and a picture correlation between the block to be processed and the reference block is likely to be low. At this time, the prediction directions of the blocks to be processed less focus near the prediction directions of the reference blocks than the reference blocks indicate close prediction directions.

In the intra prediction mode coding processing according to the present embodiment, a coding tree is switched based on a prediction direction difference between the prediction modes of the reference blocks so that an occurrence probability of a prediction mode of each block to be processed is accurately estimated, thereby reducing the amount of occurred codes in the intra prediction mode.

[Decoding Procedure]

Figure 9:
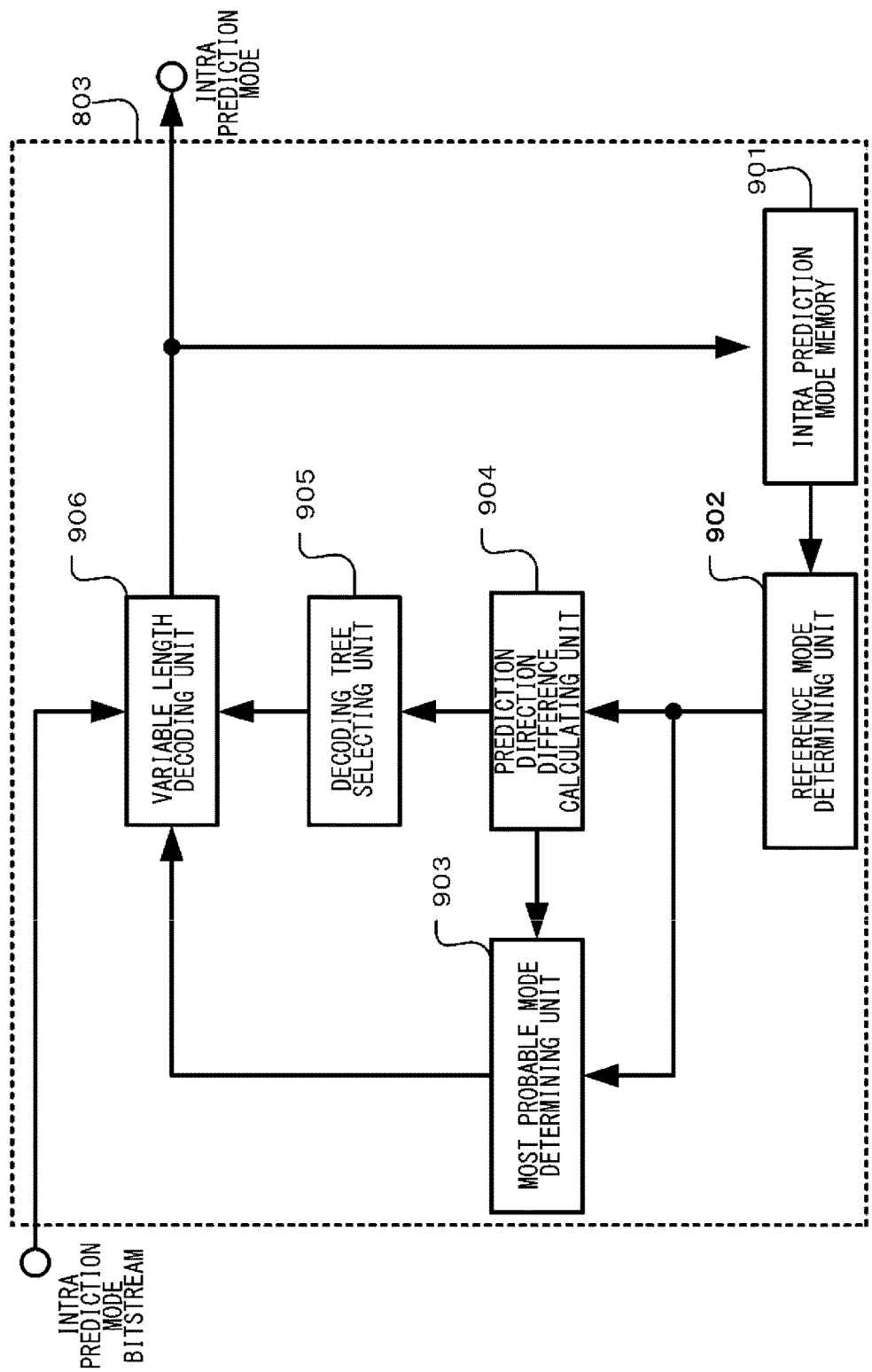
FIG. 9 is a block diagram illustrating a detailed structure of a first example of an intra prediction mode decoding unit of FIG. 8.

A first example of the intra prediction mode decoding method according to the embodiment of the present invention will be described. FIG. 9 is a block diagram of a detailed structure of the first example of the intra prediction mode decoding unit 803 in FIG. 8. The intra prediction mode decoding unit 803 according to the first example includes an intra prediction mode memory 901, a reference mode determining unit 902, a most probable mode determining unit 903, a prediction direction difference calculating unit 904, a decoding tree selecting unit 905, and a variable length decoding unit 906.

The intra prediction mode decoding processing in the intra prediction mode decoding unit 803 in FIG. 9 corresponds to the intra prediction mode coding processing in the intra prediction mode coding unit 508 in FIG. 6, and thus the structures of the intra prediction mode memory 901, the reference mode determining unit 902, the most probable mode determining unit 903, the prediction direction difference calculating unit 904 and the decoding tree selecting unit 905 in FIG. 9 have the functions corresponding to the structures of the intra prediction mode memory 601, the reference mode determining unit 602, the most probable mode determining unit 603, the prediction direction difference calculating unit 604, and the coding tree selecting unit 605 in FIG. 6, respectively.

Figure 10:
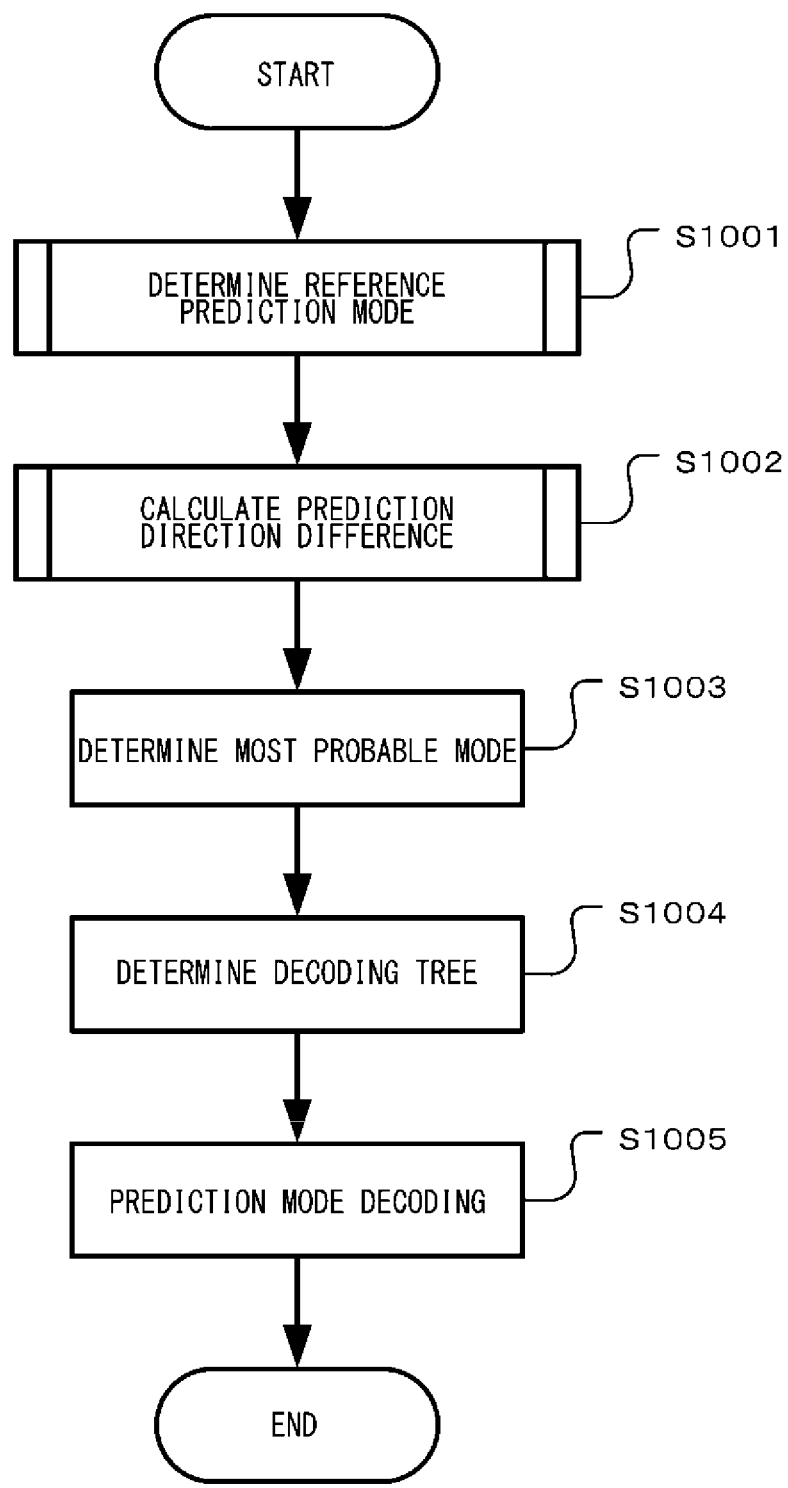
FIG. 10 is a flowchart for explaining an intra prediction mode decoding procedure by the intra prediction mode decoding unit of FIG. 9.

The intra prediction mode decoding procedure will be described below with reference to the flowchart of FIG. 10.

The reference mode determining unit 902 derives an intra prediction mode of a decoded reference block neighboring to a block to be decoded from the intra prediction mode memory 901, and determines a reference intra prediction mode (step S1001). The reference intra prediction mode determining procedure conforms to the procedure illustrated in the flowchart of FIG. 11 similarly to the reference intra prediction mode determining procedure in the reference mode determining unit 602 in FIG. 6, and thus a detailed explanation thereof will be omitted.

The prediction direction difference calculating unit 904 derives a reference intra prediction mode from the reference mode determining unit 902, and calculates a prediction direction difference (step S1002). The prediction direction difference calculating procedure conforms to the procedure illustrated in the flowchart of FIG. 12 similarly to the prediction direction calculating procedure in the prediction direction difference calculating unit 604 in FIG. 6, and thus a detailed explanation thereof will be omitted.

The most probable mode determining unit 903 derives a prediction direction difference from the prediction direction difference calculating unit 904, and derives a reference intra prediction mode from the reference mode determining unit 902. The most probable mode determining unit 903 determines a most probable mode based on the derived prediction direction difference and reference intra prediction mode (step S1003). The most probable mode determining procedure conforms to the same procedure as the most probable mode determining procedure in the most probable mode determining unit 603 in FIG. 6, and thus a detailed explanation thereof will be omitted.

The decoding tree selecting unit 905 derives a prediction direction difference from the prediction direction difference calculating unit 904, and determines a decoding tree depending on the prediction direction difference (step S1004). The decoding tree selecting procedure conforms to the same procedure as the coding tree selecting procedure in the coding tree selecting unit 605 in FIG. 6, and thus a detailed explanation thereof will be omitted. "Coding tree" is interpreted as "decoding tree."

A bitstream of an intra prediction mode is input to the variable length decoding unit 906, and the variable length decoding unit 906 derives a most probable mode from the most probable mode determining unit 903 and derives a decoding tree from the decoding tree selecting unit 905. The variable length decoding unit 906 performs variable length decoding on an intra prediction mode of a block to be decoded by use of the most probable mode and the decoding tree (step S1005). The variable length decoding unit 906 stores the decoded intra prediction mode in the intra prediction mode memory 901 and outputs it to the outside, and terminate a series of intra prediction mode decoding processing.

Second Example

[Coding Procedure]

Figure 20:
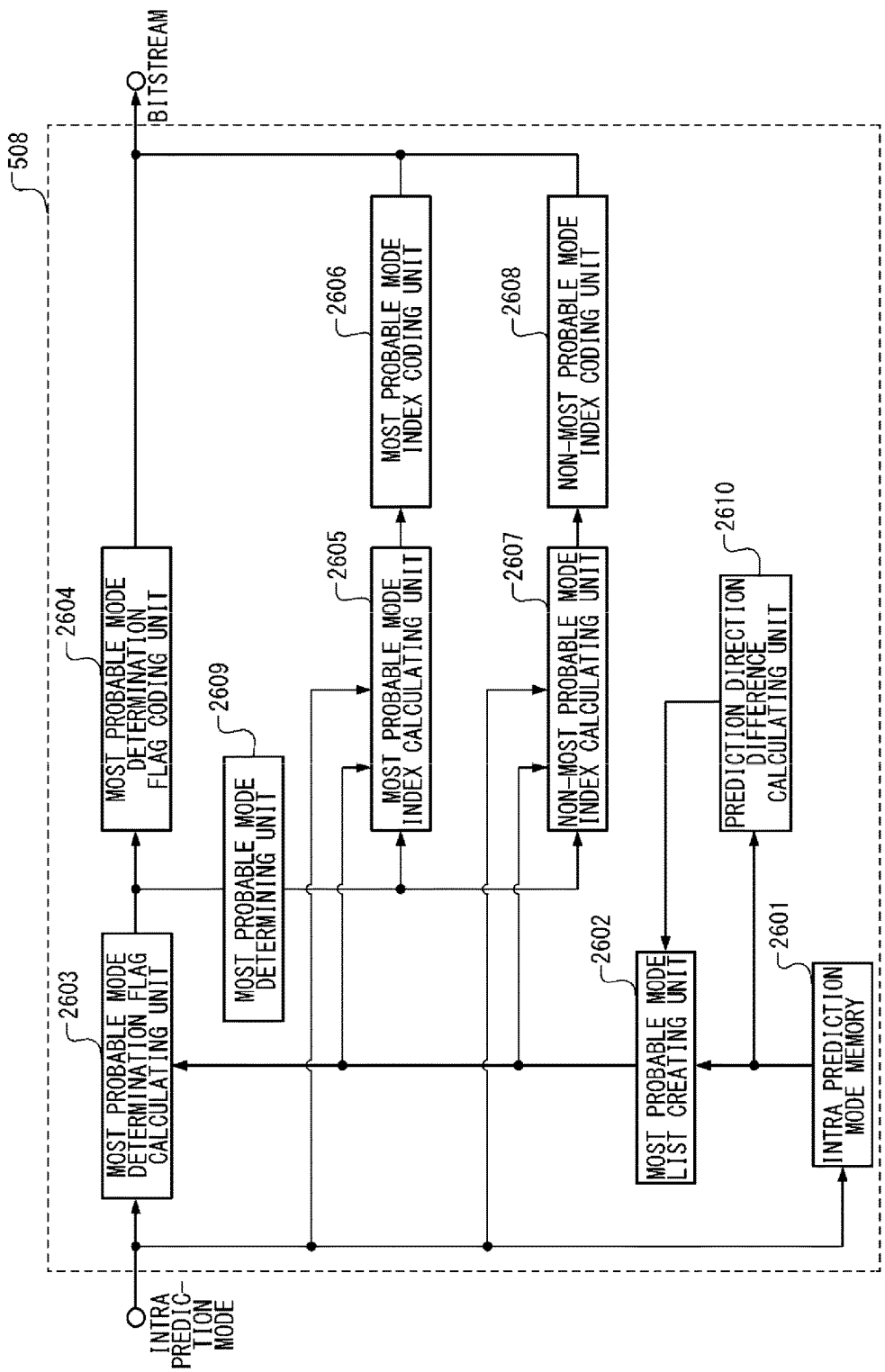
FIG. 20 is a block diagram illustrating a detailed structure of a second example of the intra prediction mode coding unit of FIG. 5.

A second example of the intra prediction mode coding method according to the embodiment of the present invention will be described. FIG. 20 is a block diagram of a detailed structure of the second example of the intra prediction mode coding unit 508 in FIG. 5. The intra prediction mode coding unit 508 according to the second example includes an intra prediction mode memory 2601, a most probable mode list creating unit 2602, a most probable mode determination flag calculating unit 2603, a most probable mode determination flag coding unit 2604, a most probable mode index calculating unit 2605, a most probable mode index coding unit 2606, a non-most probable mode index calculating unit 2607, a non-most probable mode index coding unit 2608, a most probable mode determining unit 2609, and a prediction direction difference calculating unit 2610. The intra prediction mode coding procedure will be described below with reference to the flowchart of FIG. 21.

The prediction direction difference calculating unit 2610 derives intra prediction modes refModeA and refModeB of neighboring blocks from the intra prediction mode memory 2601, and calculates a prediction direction difference diffDir between refModeA and refModeB (step S2701). The prediction direction difference calculating procedure will be described below in detail.

The most probable mode list creating unit 2602 derives a prediction direction difference diffDir from the prediction direction difference calculating unit 2610, and derives the intra prediction modes refModeA and refModeB of neighboring blocks from the intra prediction mode memory 2601. The most probable mode list creating unit 2602 creates a most probable mode list mpmList based on diffDir, refModeA and refModeB, and determines a most probable mode list size mpmlistsize (step S2702). The most probable mode list creating procedure will be described in detail. A target intra prediction mode is stored in the intra prediction mode memory 2601.

The most probable mode determination flag calculating unit 2603 derives a target prediction mode and a most probable mode list mpmList, and calculates a most probable mode determination flag mpmFlag. The most probable mode index calculating unit 2605 calculates a most probable mode index mpmIndex (step S2703), and the most probable mode determination flag coding unit 2604 codes the most probable mode determination flag mpmFlag (step S2704). The most probable mode determination flag and most probable mode index calculating procedure will be described in detail.

The most probable mode determining unit 2609 determines a most probable mode determination flag mpmFlag (step S2705).

When the most probable mode determination flag mpmFlag is true, the most probable mode index coding unit 2606 codes the most probable mode index mpmIndex (step S2706), and terminates the processing. The most probable mode index coding procedure will be described below in detail.

When the most probable mode determination flag mpmFlag is false, the non-most probable mode index calculating unit 2607 calculates a non-most probable mode index remModeIndex (step S2707), and the non-most probable mode index coding unit 2608 codes the calculated non-most probable mode remModeIndex (step S2708). The non-most probable mode index calculating procedure and the non-most probable mode coding procedure will be described below in detail.

[Prediction Direction Difference Calculating Procedure]

Figure 30:
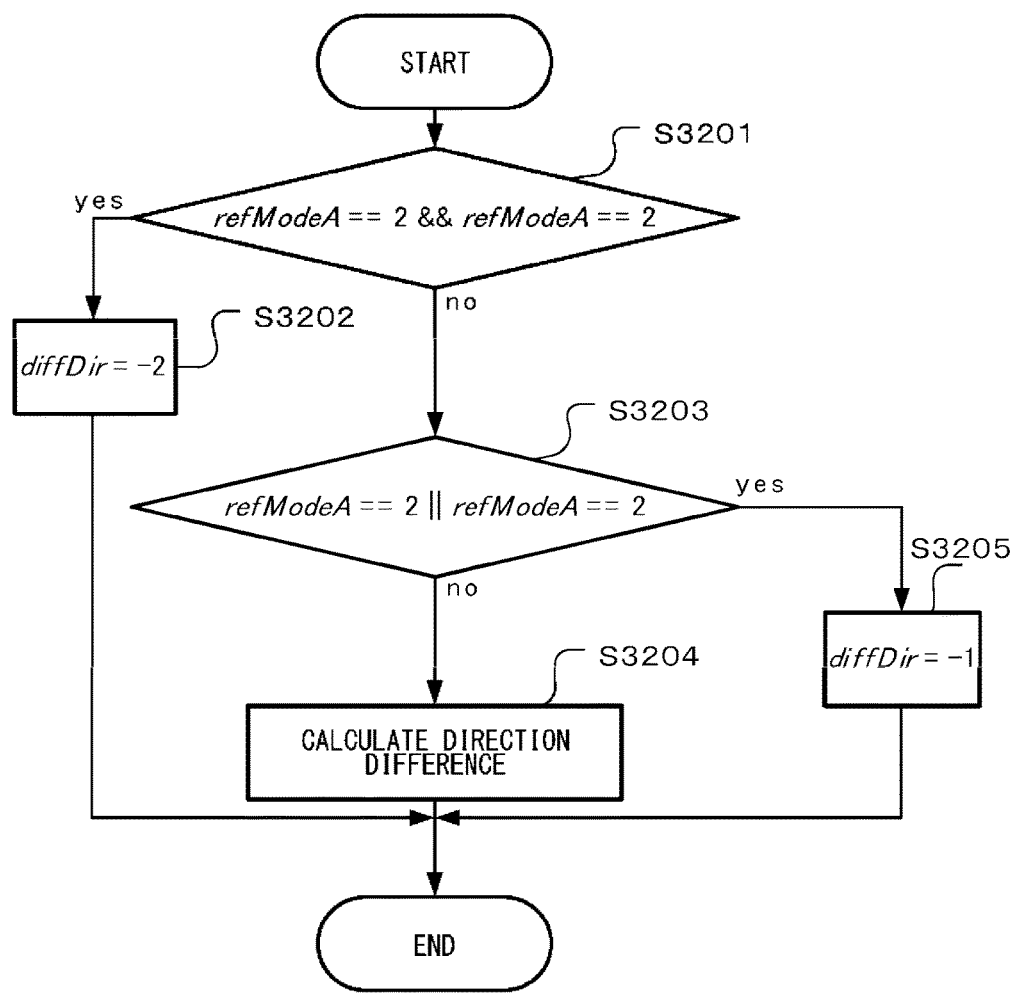
FIG. 30 is a flowchart for explaining an operation of calculating a prediction direction difference according to the second example.

The prediction direction difference calculating procedure in step S2701 in FIG. 21 will be described in detail with reference to the flowchart of FIG. 30.

The prediction direction difference calculating unit 2610 derives the intra prediction modes refModeA and refModeB of neighboring blocks from the intra prediction mode memory 2601. A determination is made as to whether both the values of refModeA and refModeB are 2 (average value mode) (step S3201).

When both the values of refModeA and refModeB are 2 (average value mode), the prediction direction difference diffDir is set at −2 (step S3202). −2 is a special value indicating that both the values of refModeA and refModeB are 2 (average value mode).

When at least one of the values of refModeA and refModeB is not 2 (average value mode), a determination is further made as to whether either refModeA or refModeB is 2 (average value mode) (step S3203). When either refModeA or refModeB is 2 (average value mode), the prediction direction difference diffDir is set at −1 (S3205). −1 is a special value indicating that either one of the values of refModeA and refModeB is 2 (average value mode).

When both the values of refModeA and refModeB are not 2 (average value mode), a prediction direction difference between refModeA and refModeB is calculated (step S3204). When a target block is a 4×4 block, a prediction direction number is determined with reference to the table of FIG. 13. Assuming the prediction direction number of refModeA as dirA and the prediction direction number of refModeB as dirB, the prediction direction difference diffDir is calculated by the following calculation equation.

$$\text{DiffDir}=\min(16-\text{abs}(\text{dir}A-\text{dir}B),\text{abs}(\text{dir}A-\text{dir}B))$$

A prediction direction number is determined also when a target block is an 8×8 block or 16×16 block similarly as in a 4×4 block, and the prediction direction difference diffDir is calculated by the following calculation equation.

$$\text{DiffDir}=\min(33-\text{abs}(\text{dir}A-\text{dir}B),\text{abs}(\text{dir}A-\text{dir}B))$$

[Most Probable Mode List Creating Procedure]

Figure 31:
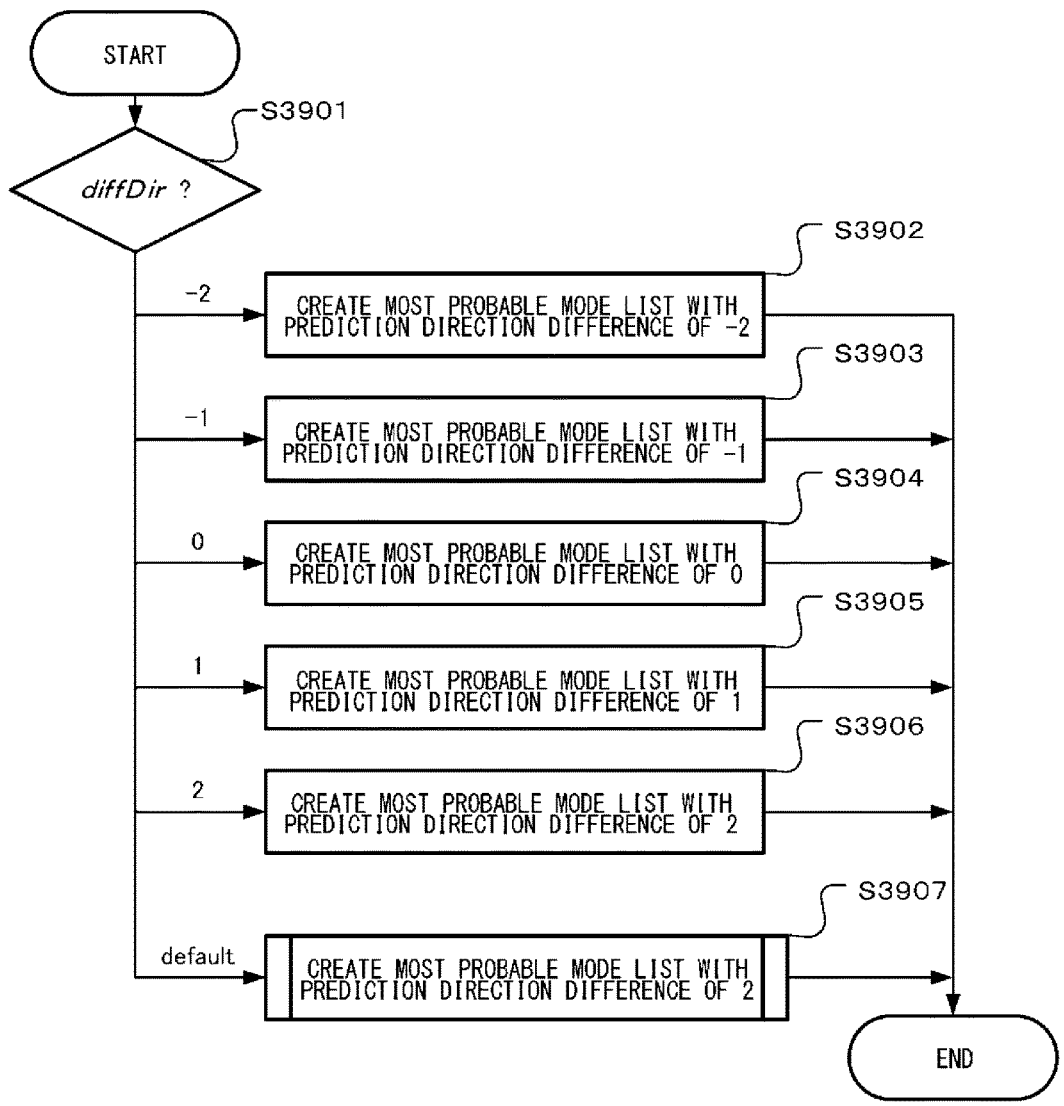
FIG. 31 is a flowchart for explaining an operation of creating a most probable mode list according to the second example.

The most probable mode list creating procedure in step S2702 in FIG. 21 will be described in detail with reference to the flowchart of FIG. 31.

The most probable mode list creating unit 2602 derives a prediction direction difference diffDir from the prediction direction difference calculating unit 2610, derives the intra prediction modes refModeA and refModeB of neighboring blocks from the intra prediction mode memory 2601, and determines a value of the prediction direction difference diffDir (step S3901).

When the value of the prediction direction difference diffDir is −2, or when both refModeA and refModeB are an average value mode (step S3902), mpmlistsize is assumed at 2 as indicated in reference numeral 4001 in FIG. 32. Further, mpmList [0] is assumed at refModeA and mpmList [1] is assumed at 0 (vertical direction prediction mode). mpmList [1] is assumed at 0 (vertical direction prediction mode) because an occurrence frequency of the vertical direction prediction mode is averagely high and an occurrence frequency of the average value mode is not high as only the average value mode is assumed as a most probable mode.

When the value of the prediction direction difference diffDir is −1, or when either refModeA or refModeB is an average value mode (step S3903), mpmlistsize is assumed at 4 as indicated in reference numeral 4002 in FIG. 32. Further, it is assumed that mpmList [0] is min (refModeA, refModeB), mpmList [1] is max (refModeA, refModeB), mpmList[2] is left(dirMode), and mpmList[3] is right(dirMode). dirMode is a prediction mode of refModeA or refModeB which is not an average value mode, left(dirMode) is a prediction mode neighboring on the left of dirMode, and right(dirMode) is a prediction mode neighboring on the right of dirMode.

When the value of the prediction direction difference diffDir is 0 (step S3904), or when refModeA and refModeB are the same and both of them are not an average value mode, mpmlistsize is assumed at 3 as indicated in reference numeral 4003 in FIG. 32. It is further assumed that mpmList [0] is refModeA, mpmList [1] is left(refModeA), and mpmList[2] is right(refModeA). left (refModeA) is assumed as a prediction mode neighboring on the left of refModeA and right(refModeA) is assumed as a prediction mode neighboring on the right of refModeA.

When the value of the prediction direction difference diffDir is 1 (step S3905), or when refModeA is neighboring to refModeB, mpmlistsize is assumed at 4 as indicated in reference numeral 4004 in FIG. 32. It is further assumed that mpmList[0] is min(redModeA, refModeB), mpmList[1] is max(refModeA, refModeB), mpmList [2] is left (leftMode), and mpmList [3] is right (rightMode). leftMode is assumed as a left-direction prediction mode out of refModeA and refModeB, rightMode is assumed as a right-direction prediction mode out of refModeA and refModeB, left(leftMode) is assumed as a prediction mode neighboring on the left of leftMode, and right(rightMode) is assumed as a prediction mode neighboring on the right of rightMode.

When the value of the prediction direction difference diffDir is 2 (step S3906), mpmlistsize is assumed at 5 as indicated in reference numeral 4005 in FIG. 32. It is further assumed that mpmList [0] is min (refModeA, refModeB, interMode), mpmList [1] is median (refModeA, refModeB, interMode), mpmList [2] is max (refModeA, refModeB, interMode), mpmList [3] is left (leftMode), and mpmList [4] is right (rightMode). interMode is assumed as a prediction mode between refModeA and refModeB, median (refModeA, refModeB, interMode) is assumed as a median value of refModeA, refModeB and interMode, leftMode is assumed as a left-direction prediction mode out of refModeA and refModeB, rightMode is assumed as a right-direction prediction mode out of refModeA and refModeB, left (leftMode) is assumed as a prediction mode neighboring on the left of leftMode, and right (rightMode) is assumed as a prediction mode neighboring on the right of rightMode.

When any of the above conditions is not met (step S3907), or when the value of the prediction direction difference diffDir is larger than or equal to 3, a block size of a target block is referred to in addition to the prediction direction difference diffDir.

When the block size is 4×4, mpmlistsize is assumed at 5 as indicated in reference numeral 4006 in FIG. 32. mpmLists are sorted in ascending order assuming mpmList [0] at min (refModeA, refModeB), mpmList [1] at max (refModeA, refModeB), mpmList [2] at min (left (refModeA), right (refModeA)), mpmList[3] at min(left(refModeB), right(refModeB)), and mpmList[4] at an average value mode.

When the block size is not 4×4, mpmlistsize is assumed at 7 as indicated in reference numeral 4007 in FIG. 32. Further, mpmLists are sorted in ascending order assuming mpmList[0] at min(refModeA, refModeB), mpmList[1] at max(refModeA, refModeB), mpmList[2] at left(refModeA), mpmList[3] at right(refModeA), mpmList[4] at left (refModeB), mpmlist[5] at right (refModeB), and mpmList[6] at an average value mode.

In step S3907, not only the prediction modes neighboring to the reference prediction modes but also the average value mode is added to the most probable mode list because of the following reasons. Step S3907 is when the prediction direction difference is larger than or equal to 3. When the direction difference between refModeA and refModeB is large, a picture correlation between the reference block A and the reference block B is estimated to be low. At this time, a degree of focus near refModeA and refModeB is reduced and an occurrence frequency of the average value mode is averagely increased unlike when the prediction direction difference is small.

[Most Probable Mode Determination Flag and Most Probable Mode Index Calculating Procedure]

Figure 25:
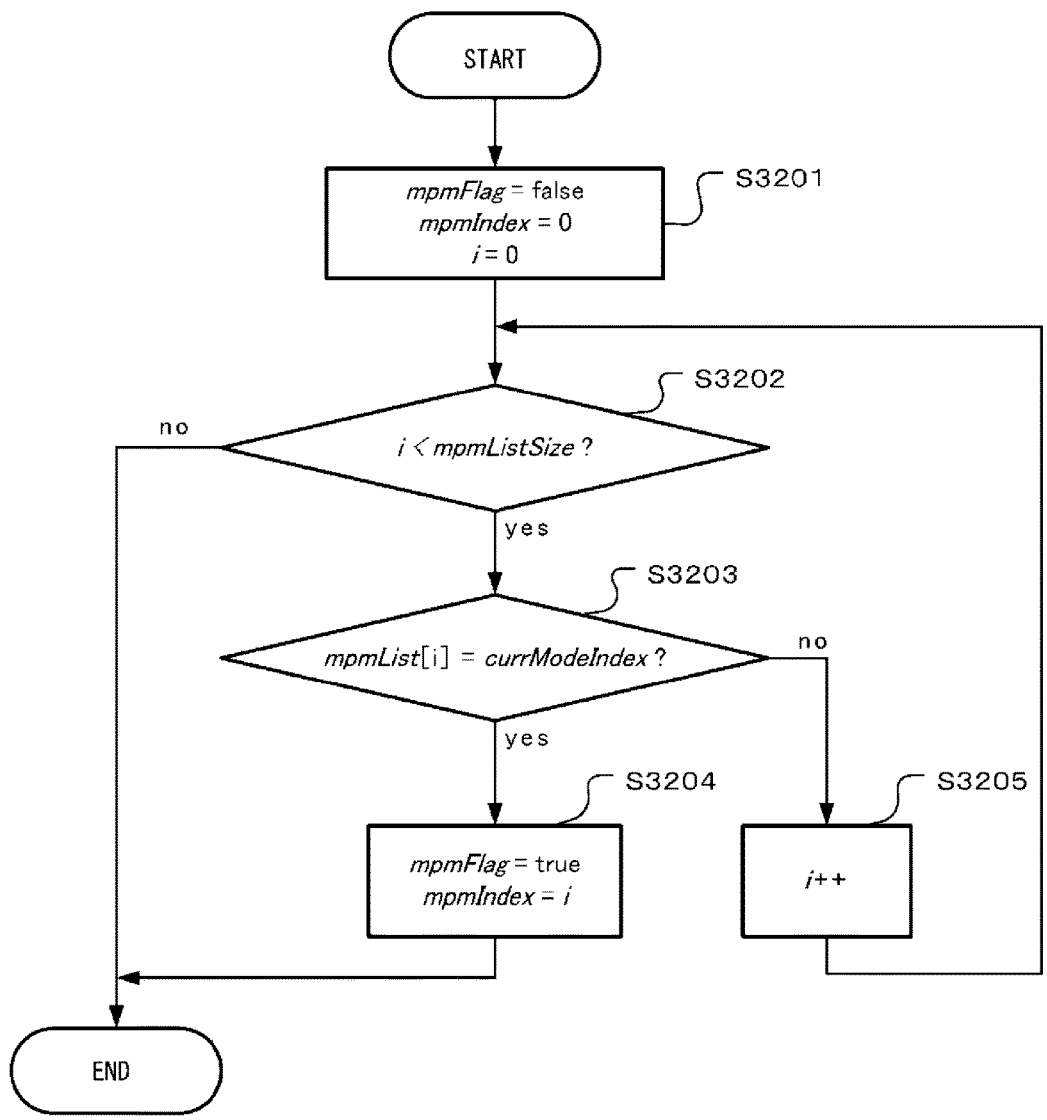
FIG. 25 is a flowchart for explaining an operation of calculating a most probable mode determination flag and a most probable mode index according to the second example.

The most probable mode determination flag and most probable mode index calculating procedure in step S2703 in FIG. 21 will be described in detail with reference to the flowchart of FIG. 25.

In the present procedure, the processing is performed by scanning mpmList in ascending order. The most probable mode determination flag calculating unit 2603 and the most probable mode index calculating unit 2605 initialize a most probable mode determination flag mpmFlag and a most probable mode index mpmIndex at false and 0, respectively. A variable i for scanning mpmlist is initialized at 0 (step S3201).

When the variable i is less than mpmListSize (step S3202), or when all the elements in mpmList are not completely scanned, mpmList[i] is compared with currModeIndex (step S3203). When mpmList [i] is equal to currModeIndex, the fact indicates that the target prediction mode is equal to the i-th element in the most probable mode list, mpmFlag is set at true and mpmIndex is set at i (step S3204), and the processing proceeds to step S2704 in FIG. 21. When mpmList[i] is different from currModeIndex, i is incremented by 1 (step S3205), and the scanning is continued.

Figure 21:
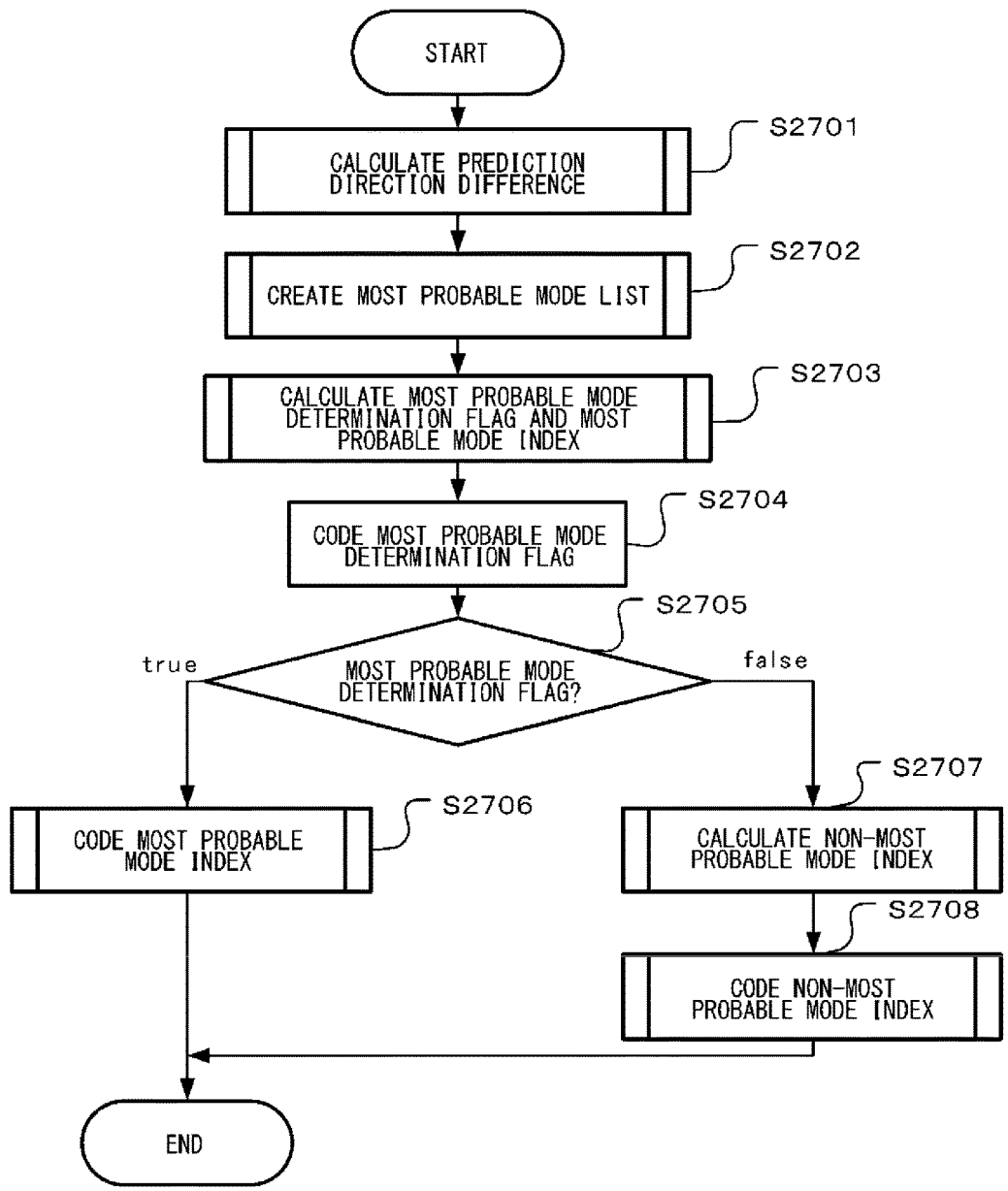
FIG. 21 is a flowchart for explaining an intra prediction mode coding procedure by the intra prediction mode coding unit of FIG. 20.

When the variable i is larger than or equal to mpmListSize in step S3202, or when all the elements in mpmList are completely scanned, the most probable mode flag and most probable mode index calculating procedure is terminated, and the processing proceeds to step S2704 in FIG. 21. At this time, it is indicated that the target prediction mode is not contained in the most probable mode list, and mpmFlag and mpmIndex are not reset. That is, mpmFlag=false and mpmIndex=0 are obtained.

[Most Probable Mode Index Coding Procedure]

Figure 33:
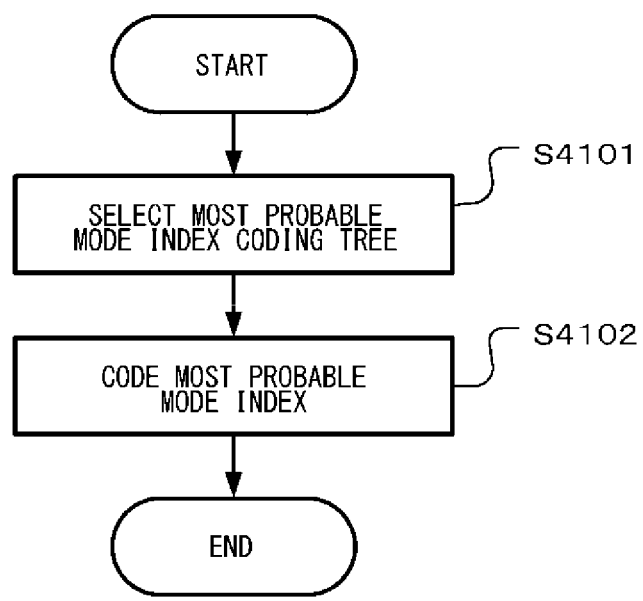
FIG. 33 is a flowchart for explaining an operation of coding a most probable mode according to the second example.

The most probable mode index coding procedure in step S2706 in FIG. 21 will be described in detail with reference to the flowchart of FIG. 33.

The most probable mode index coding unit 2606 derives mpmlist and mpmlistsize from the most probable mode list creating unit 2602.

The most probable mode index coding unit 2606 selects a coding tree used for coding the most probable mode index mpmIndex based on mpmlistsize (step S4101).

Figure 34:
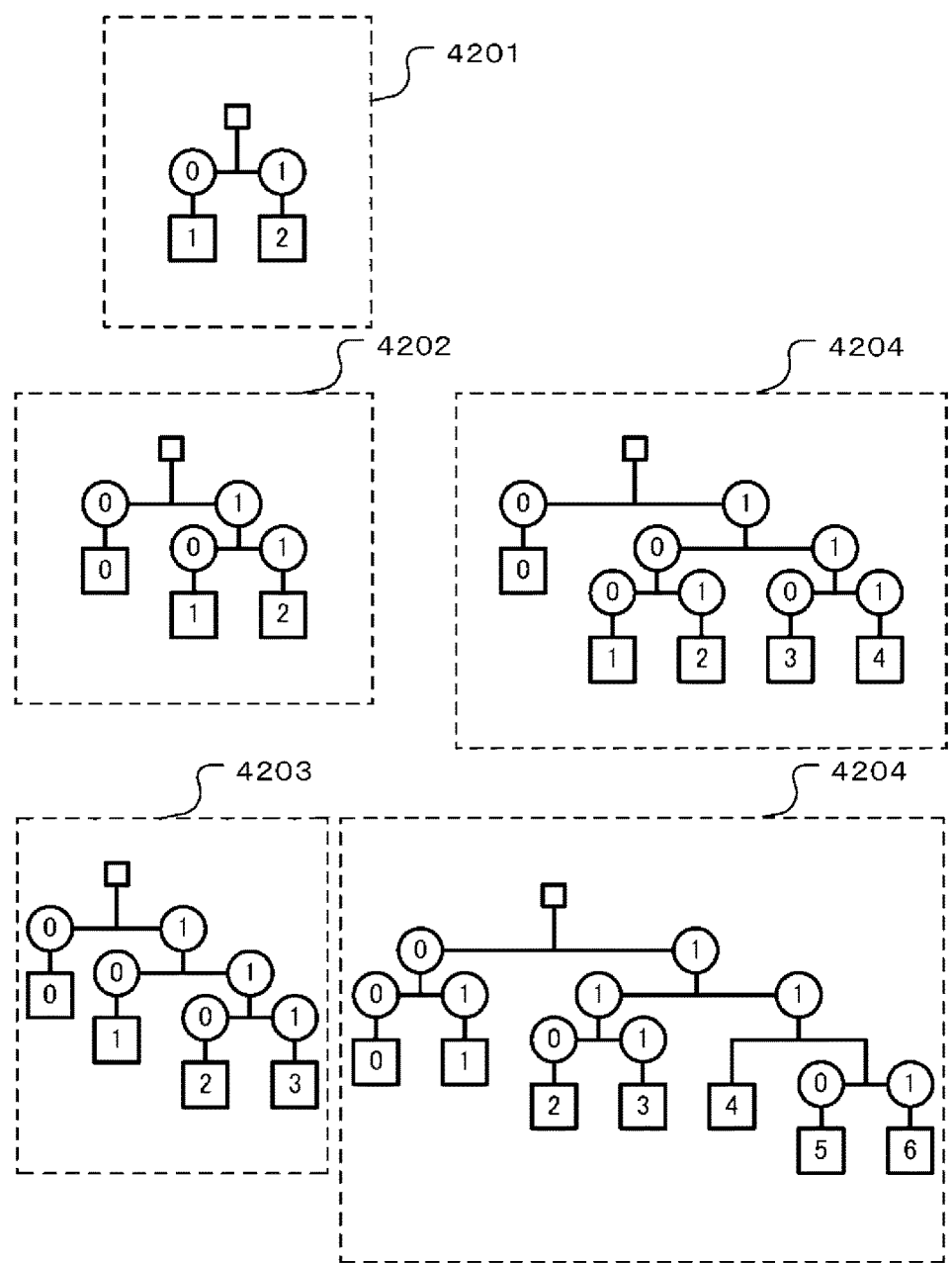
FIG. 34 is a diagram for explaining coding trees/decoding trees for coding/decoding a most probable mode according to the second example.

FIG. 34 illustrates coding trees as selection candidates. Reference numeral 4201 in FIG. 34 is a coding tree when mpmlistsize is 2. Reference numeral 4202 in FIG. 34 is a coding tree when mpmlistsize is 3. Reference numeral 4203 in FIG. 34 is a coding tree when mpmlistsize is 4. Reference numeral 4204 in FIG. 34 is a coding tree when mpmlistsize is 5. Reference numeral 4205 in FIG. 34 is a coding tree when mpmlistsize is 7. In the most probable mode coding tree, a bitstream having a shorter code length is assigned as the most probable mode is on a higher order (with a smaller mode number).

The most probable mode index coding unit 2606 codes mpmIndex by use of the selected coding tree (step S4102), and terminates the processing.

[Non-Most Probable Mode Index Calculating Procedure]

Figure 26:
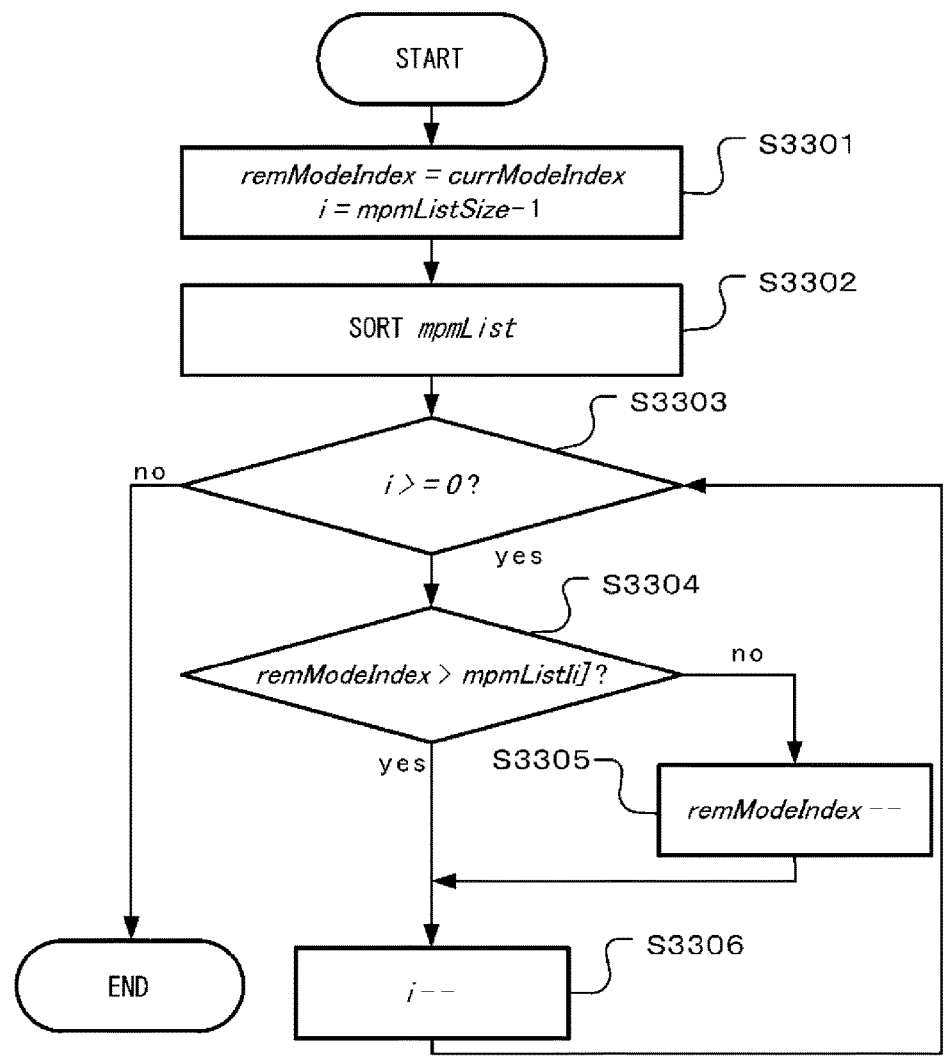
FIG. 26 is a flowchart for explaining an operation of calculating a non-most probable mode index according to the second example.

The non-most probable mode index calculating procedure in step S2707 in FIG. 21 will be described in detail with reference to the flowchart of FIG. 26.

In the present procedure, the processing is performed by scanning mpmlist in descending order of indexes. The non-most probable mode index calculating unit 2607 initializes the non-most probable mode index remModeIndex by a target prediction mode currModeIndex and initializes the variable i for scanning mpmList by mpmListSize-1 (step S3301), and sorts mpmList in ascending order of values (step S3302).

When the variable i is larger than or equal to 0 (step S3303), or when all the elements in mpmList are not completely scanned, remModeIndex is compared with mpmList[i] (step S3304). When remModeIndex is larger than mpmList[i], the value of remModeIndex is decremented by 1 (step S3305). The value of the variable i is decremented by 1 (step S3306), and the scanning is continued.

When the variable i is less than 0 or when all the elements in mpmList are completely scanned in step S3303, the non-most probable mode index calculating procedure is terminated and the processing proceeds to step S2708 in FIG. 21.

[Non-Most Probable Mode Index Coding Procedure]

Figure 27:
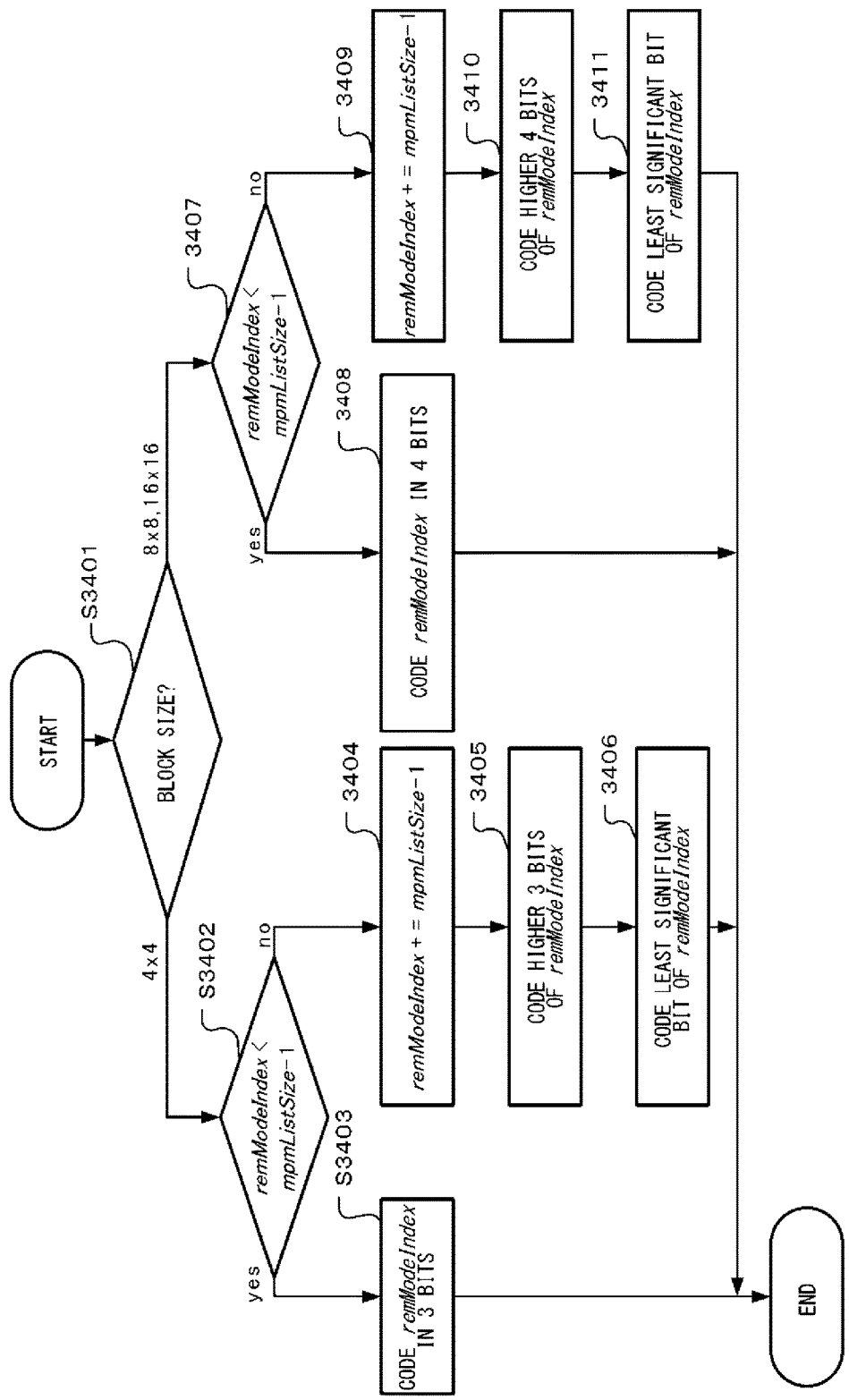
FIG. 27 is a flowchart for explaining an operation of coding a non-most probable mode index according to the second example.

The non-most probable mode index coding procedure in step S2708 in FIG. 21 will be described in detail with reference to the flowchart of FIG. 27.

The non-most probable mode index coding unit 2608 determines a target block size (step S3401).

When the target block is a 4×4 block, the non-most probable mode index coding unit 2608 compares the values of remModeIndex and mpmListSize-1 (step S3402). When remModeIndex is smaller than mpmListSize-1, remModeIndex is coded in three bits, and the processing is terminated (step S3403). Otherwise, or when remModeIndex is larger than or equal to mpmListSize-1, remModeIndex is added with mpmListSize-1 (step S3404), and the higher three bits of remModeIndex are coded (step S3405). The least significant bit of remModeIndex is coded (step S3406), and the processing is terminated.

When the target block is a 4×4 block, 17 intra prediction patterns are defined. In the present example, the number of most probable modes mpmListSize is at least two, and thus the non-most probable mode index remModeIndex is converted into either value of [0, 14]. Therefore, when fixed length coding is performed on the non-most probable mode index remModeIndex, the conversion is performed into a four-bit code word. As the number of most probable modes mpmListSize is larger, however, the possible candidates for the non-most probable mode index decreases, and all remModeIndexes expressed in four bits are redundant. Thus, in the present procedure, remModeIndex is converted into a three-bit or four-bit code word, thereby performing variable length coding.

When the target block is an 8×8 block or 16×16 block, the non-most probable mode index coding unit 2608 compares the values of remModeIndex and mpmListSize-1 (step S3407). When mpmModeIndex is smaller than mpmListSize-2, remModeIndex is coded in four bits, and the processing is terminated (step S3408). Otherwise, or when remModeIndex is larger than or equal to mpmListSize-2, remModeIndex is added with mpmListSize-2 (step S3409), and the higher four bits of remModeIndex are coded (step S3410). Further, the least significant bit of remModeIndex is coded (step S3411), and the processing is terminated.

When the target block is an 8×8 block or 16×16 block, 34 intra prediction patterns are defined. In the present example, the number of most probable modes mpmListSize is at least two, and thus the non-most probable mode index remModeIndex is converted into either of [0, 31]. Thus, when fixed length coding is performed on the non-most probable mode index remModeIndex, the conversion is performed into a five-bit code word. All remModeIndexes expressed in five bits are redundant like in a 4×4 block. Therefore, in the present procedure, remModeindex is converted into a four-bit or five-bit code word, thereby performing variable length coding.

[Decoding Procedure]

Figure 22:
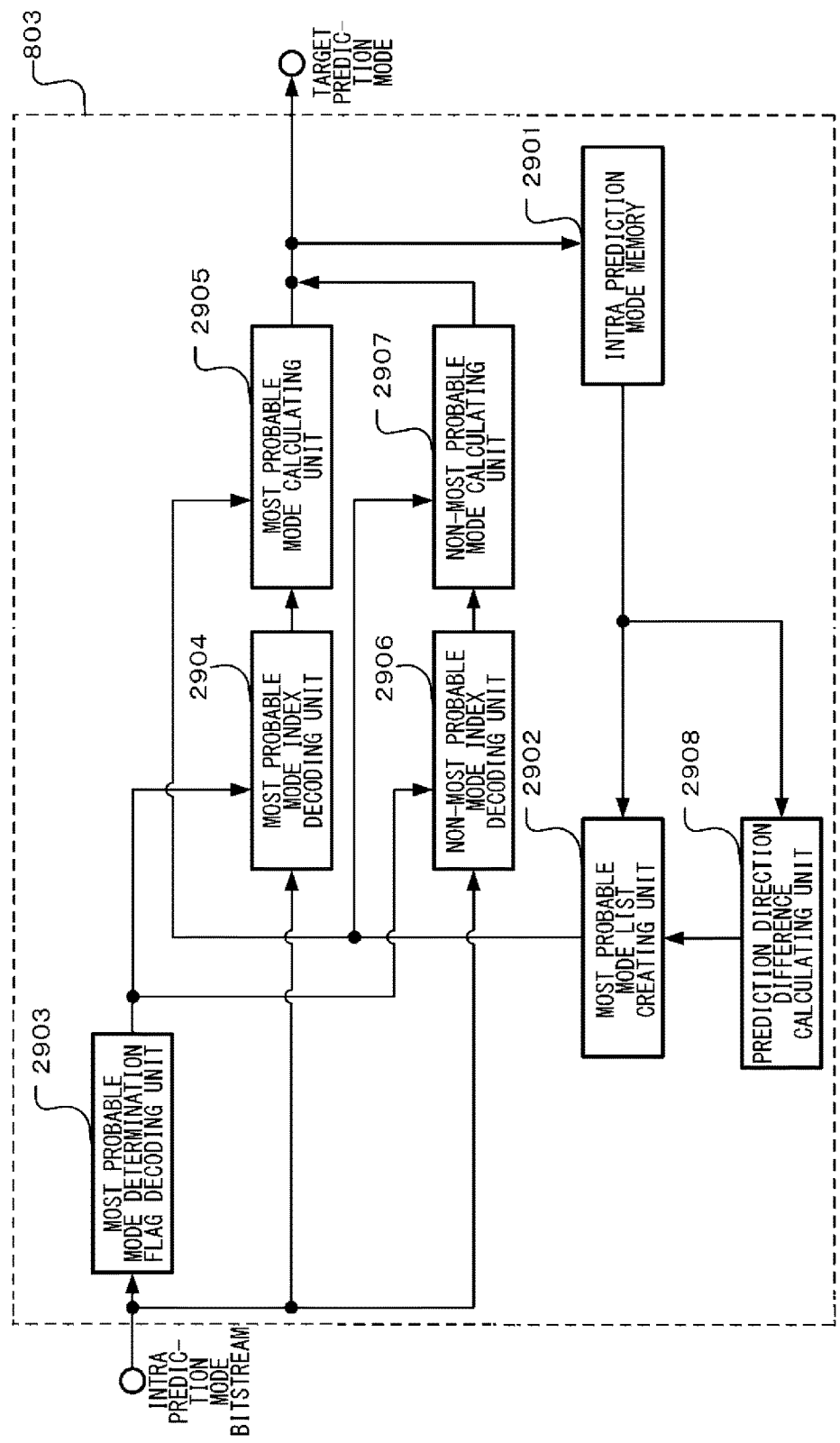
FIG. 22 is a block diagram illustrating a detailed structure of a second example of the intra prediction mode decoding unit of FIG. 8.

A second example of the intra prediction mode decoding method according to the present embodiment of the present invention will be described. FIG. 22 is a block diagram illustrating a detailed structure of the second example of the intra prediction mode decoding unit 803 in FIG. 8. The intra prediction mode decoding unit 803 according to the second example includes an intra prediction mode memory 2901, a most probable mode list creating unit 2902, a most probable mode determination flag decoding unit 2903, a most probable mode index decoding unit 2904, a most probable mode calculating unit 2905, a non-most probable mode index decoding unit 2906, a non-most probable mode calculating unit 2907, and a prediction direction difference calculating unit 2908.

The intra prediction mode decoding processing in the intra prediction mode decoding unit 803 in FIG. 22 corresponds to the intra prediction mode coding processing in the intra prediction mode coding unit 508 in FIG. 20, and thus the structures of the intra prediction mode memory 2901, the most probable mode list creating unit 2902, and the prediction direction difference calculating unit 2908 in FIG. 22 have the same functions as the structures of the intra prediction mode memory 2601, the most probable mode list creating unit 2602, and the prediction direction difference calculating unit 2610 in FIG. 20, respectively.

Figure 23:
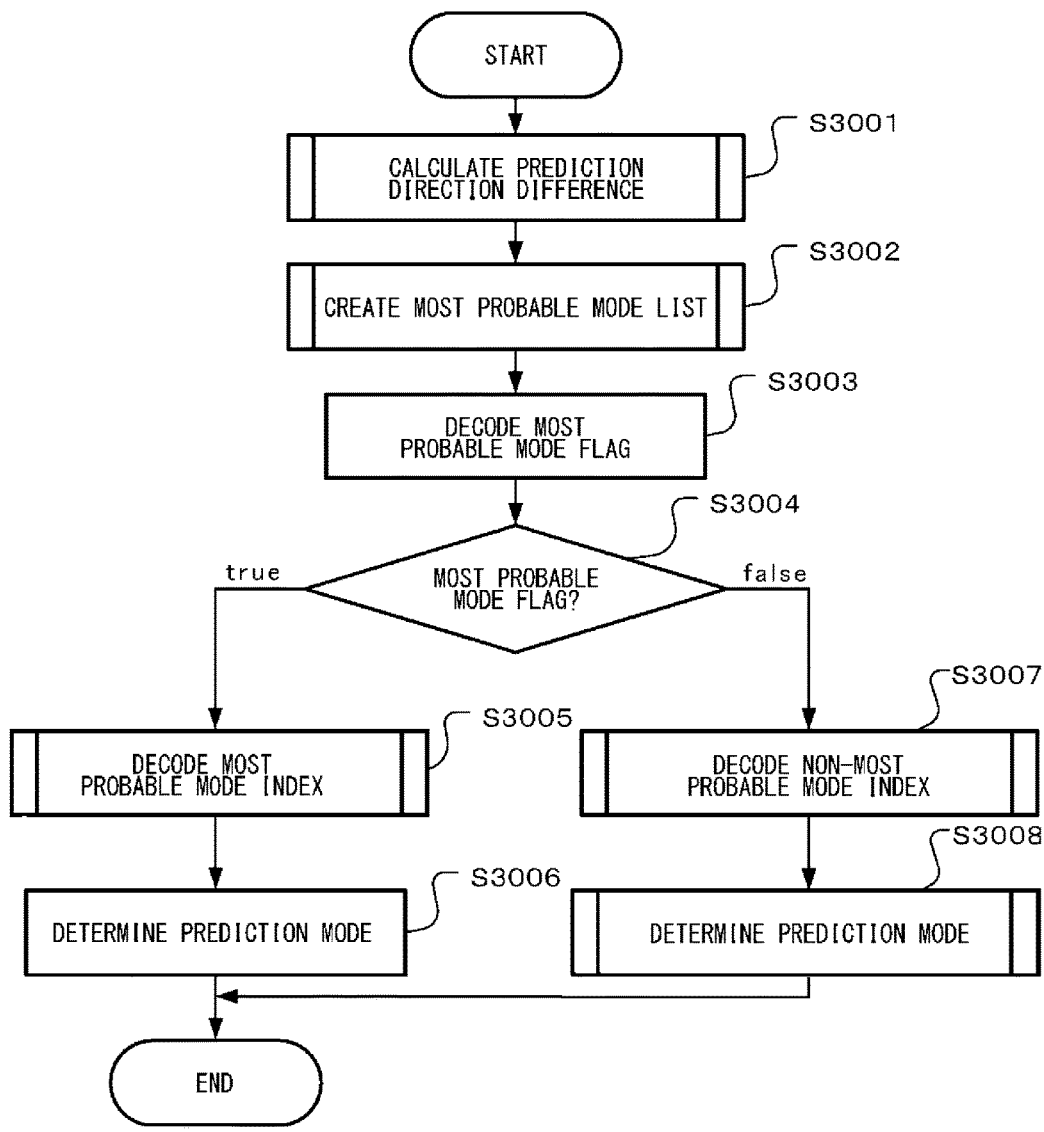
FIG. 23 is a flowchart for explaining an intra prediction mode decoding procedure by the intra prediction mode decoding unit of FIG. 21.

The intra prediction mode decoding procedure will be described below with reference to the flowchart of FIG. 23.

The prediction direction difference calculating unit 2908 derives the intra prediction modes refModeA and refModeB of neighboring blocks from the intra prediction mode memory 2901, and calculates a prediction direction difference diffDir (step S3001). The prediction direction difference calculating procedure conforms to the procedure illustrated in FIG. 30 similarly to the prediction direction difference calculating unit 2610 in FIG. 20, and thus a detailed explanation thereof will be omitted.

The most probable mode list creating unit 2902 derives the intra prediction modes refModeA and refModeB of neighboring blocks from the intra prediction mode memory 2901, and derives a prediction direction difference diffDir from the prediction direction difference calculating unit 2908. The most probable mode list creating unit 2902 creates a most probable mode list mpmList based on derived refModeA, refModeB and diffDir, and determines a size mpmListSize of the most probable mode list (step S3002). The most probable mode list creating procedure conforms to the procedure illustrated in the flowchart of FIG. 31 similarly to the most probable mode list creating procedure in the most probable mode list creating unit 2602 in FIG. 20, and thus a detailed explanation thereof will be omitted.

The most probable mode determination flag decoding unit 2903 reads an one-bit bitstream to decode a most probable mode determination flag mpmFlag (step S3003), and determines a value of the most probable mode determination flag mpmFlag (step S3004).

When the most probable mode determination flag mpmFlag is true, the most probable mode index decoding unit 2904 decodes a most probable mode index mpmIndex (step S3005). The most probable mode index decoding procedure will be described in detail. Further, the most probable mode calculating unit 2905 assumes the mpmIndex-th element mpmList[mpmIndex] in the most probable mode list mpmList as target prediction mode currModeIndex (step S3006). The target prediction mode currModeIndex is stored in the intra prediction mode memory 2901, and the processing is terminated.

When the most probable mode determination flag mpmFlag is false, the non-most probable mode index decoding unit 2906 decodes the non-most probable mode index remModeIndex (step S3007), and the non-most probable mode calculating unit 2907 calculates a target prediction mode currModeIndex based on calculated remModeIndex (step S3008). The target prediction mode currModeIndex is stored in the intra prediction mode memory 2901, and the processing is terminated. The non-most probable mode index decoding procedure and the target prediction mode calculating procedure will be described below.

[Most Probable Mode Index Decoding Procedure]

Figure 24:
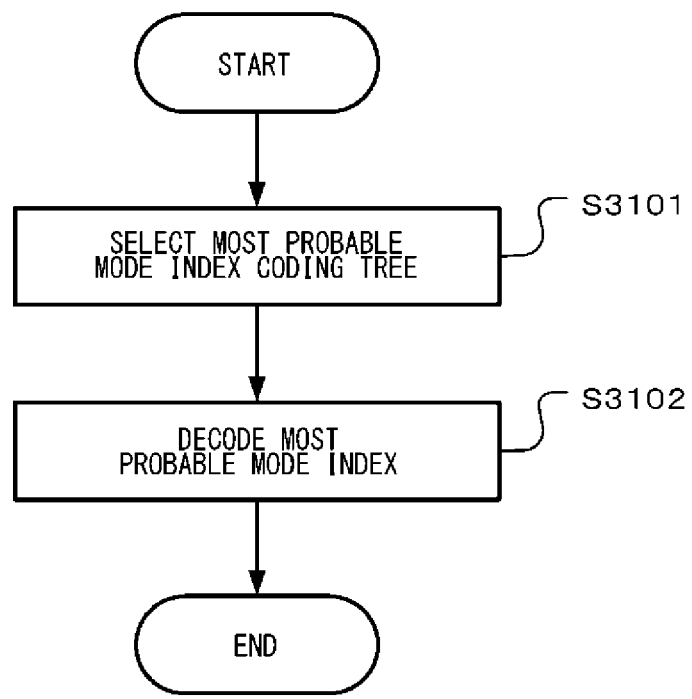
FIG. 24 is a flowchart for explaining an operation of decoding a most probable mode according to the second example.

The most probable mode index decoding procedure in step S3005 in FIG. 23 will be described in detail with reference to the flowchart of FIG. 24.

The most probable mode index decoding unit 2904 derives mpmlist and mpmlistsize from the most probable mode list creating unit 2902.

The most probable mode index decoding unit 2904 selects a decoding tree used for decoding the most probable mode index mpmIndex based on mpmlistsize (step S3101).

FIG. 34 illustrates decoding trees as selection candidates. Reference numeral 4201 in FIG. 34 is a decoding tree when mpmlistsize is 2. Reference numeral 4202 in FIG. 34 is a decoding tree when mpmlistsize is 3. Reference numeral 4203 in FIG. 34 is a decoding tree when mpmlistsize is 4. Reference numeral 4204 in FIG. 34 is a decoding tree when mpmlistsize is 5. Reference numeral 4205 in FIG. 34 is a decoding tree when mpmlistsize is 7.

The most probable mode index decoding unit 2904 decodes mpmIndex by use of the selected decoding tree (step S3102), and terminates the processing.

[Non-Most Probable Mode Index Decoding Procedure]

Figure 28:
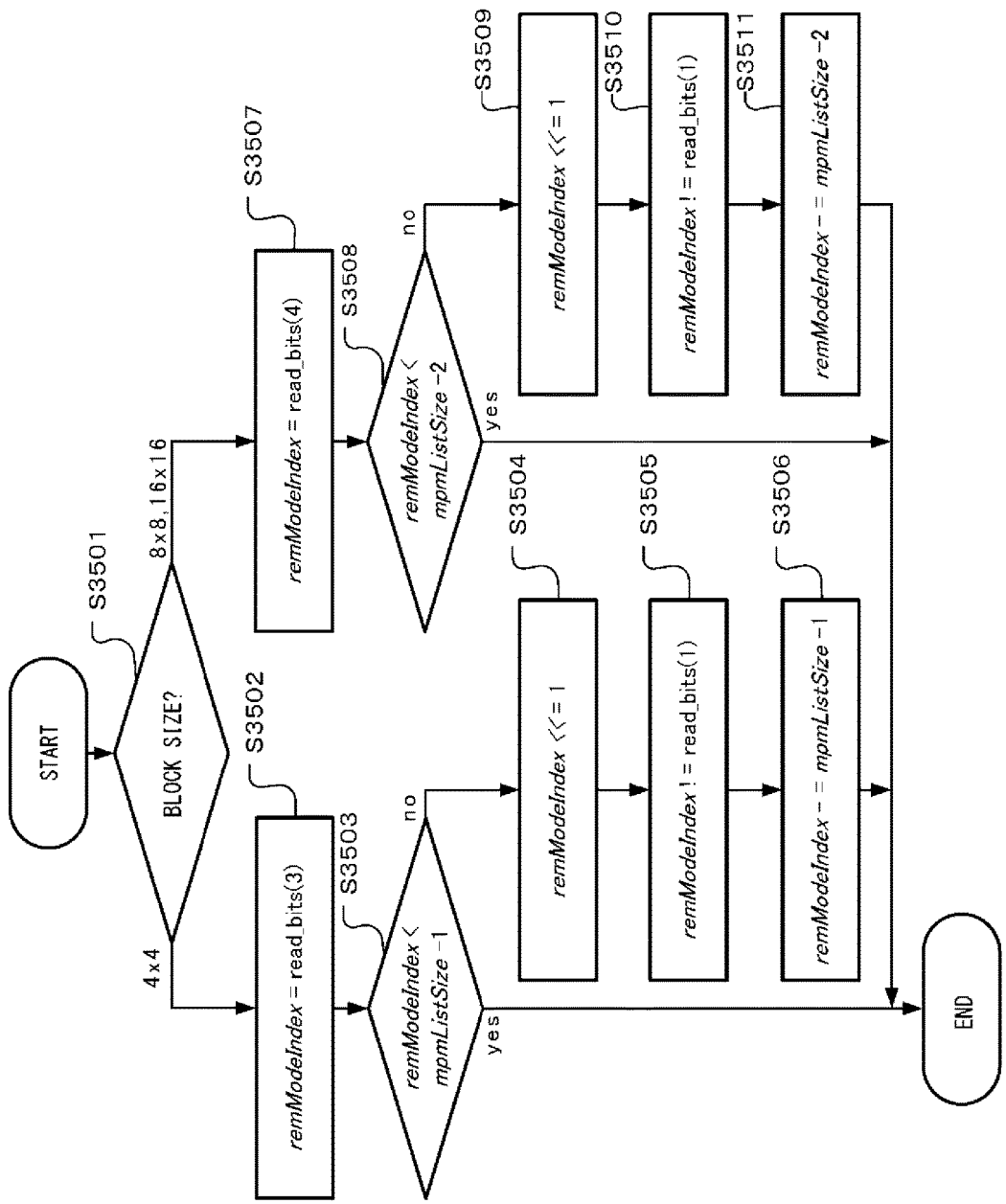
FIG. 28 is a flowchart for explaining an operation of decoding a non-most probable mode index according to the second example.

The non-most probable mode index decoding procedure in step S3007 in FIG. 23 will be described in detail with reference to the flowchart of FIG. 28.

The non-most probable mode index decoding unit 2906 determines a target block size (step S3501).

When the target block is a 4×4 block, three-bit fixed length decoding is performed to assume remModeIndex (step S3502). A value of remModeIndex is determined (step S3503). When remModeIndex is smaller than mpmListSize-1, remModeIndex is defined and the processing is terminated. Otherwise, remModeIndex is shifted to the right by one bit (step S3504), and a one-bit bitstream is read and is added to remModeIndex (step S3505). mpmListSize-1 is subtracted from remModeIndex to determine final remModeIndex (step S3506), and the processing is terminated.

When the target block is an 8×8 block or 16×16 block, four-bit fixed length decoding is performed to assume remModeIndex (step S3507). A value of remModeIndex is determined (step S3508). When remModeIndex is smaller than mpmListSize-2, remModeIndex is defined and the processing is terminated. Otherwise, remModeIndex is shifted to the right by one bit (step S3509), and an one-bit bitstream is read and is added to remModeIndex (step S3510). mpmListSize-2 is subtracted from remModeIndex to determine final remModeIndex (step S3511), and the processing is terminated.

[Non-Most Probable Mode Calculating Procedure]

Figure 29:
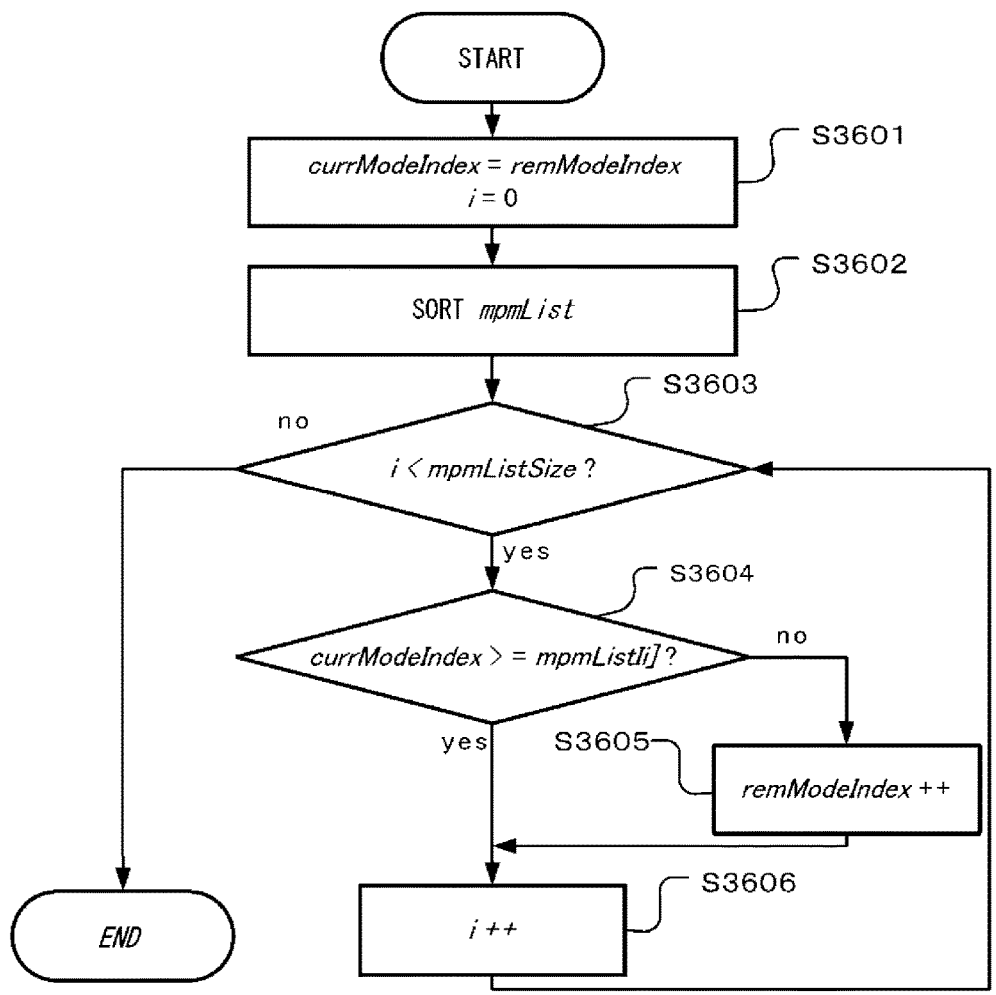
FIG. 29 is a flowchart for explaining an operation of calculating a target prediction mode according to the second example.

The prediction mode calculating procedure in step S3008 in FIG. 23 will be described in detail with reference to the flowchart of FIG. 29.

In the present procedure, mpmList is scanned in ascending order of indexes thereby to perform the processing. The non-most probable mode calculating unit 2907 initializes the target prediction mode currModeIndex at the non-most probable mode index remModeIndex and initializes the variable i for scanning mpmlist at 0 (step S3601), and sorts mpmList in ascending order of the values (step S3602).

When the variable i is less than mpmListSize (step S3603) or when all the elements in mpmList are not completely scanned, currModeIndex is compared with mpmList[i] (step S3604). When corrModeIndex is larger than or equal to mpmList[i], the value of currModeIndex is added with 1 (step S3605). The value of the variable i is added with 1 (step S3606), and the scanning is continued.

When i is larger than or equal to mpmListSize in step S3603, or when all the elements in mpmList are completely scanned, the processing is terminated.

The picture coding device and picture decoding device according to the first example described above obtain the following operation effects.

(1) A coding tree is switched based on a prediction direction difference between processed prediction modes. A prediction direction indicated by the intra prediction mode has a correlation with a target picture, and thus a correlation between decoded pictures in reference blocks is estimated based on the prediction direction difference between the intra prediction modes and a proper probability model can be set based on the correlation, thereby reducing the amount of occurred codes in the prediction mode of the target picture.

(2) When the prediction direction difference is small, a correlation between decoded pictures in reference blocks is high and a correlation between a block to be processed and a reference block is also estimated to be high. The occurred intra prediction modes focus around the prediction direction indicated by the mode matching with the reference prediction mode, and thus a code length of the intra prediction mode indicating the prediction direction near the prediction direction of the reference prediction mode is shortened, thereby reducing the entire amount of occurred codes.

(3) When the prediction direction difference is large, a correlation between decoded pictures in reference blocks is low, and a correlation between a block to be processed and a reference block is estimated to be lower than that in the case where the prediction direction difference is small. In this case, a deviation of the code length of each prediction mode is reduced, thereby reducing the amount of occurred codes.

(4) A coding tree is switched based on the prediction direction difference between prediction modes of processed blocks, and thus the number of coding trees to be created is half the number of prediction directions capable of being derived in the intra prediction modes. A degree of complexity can be remarkably reduced as compared with the structure considering all the combinations of prediction modes.

The picture coding device and picture decoding device according to the second example obtain the following operation effects.

(1) A coding tree of a most probable mode is switched based on a prediction direction difference between processed prediction modes. A prediction direction indicated by the intra prediction mode has a correlation with a target picture, and thus a correlation between decoded pictures in reference blocks is estimated based on the prediction direction difference between the intra prediction modes, and a proper probability model can be set based on the correlation, thereby reducing the amount of occurred codes.

(2) When the prediction direction difference is small, a correlation between decoded pictures in reference blocks is high and a correlation between a block to be processed and a reference block is also estimated to be high. The occurred intra prediction modes focus around the prediction direction indicated by the mode matching with the reference prediction mode, and thus the intra prediction mode indicating the prediction direction neighboring to the prediction direction of the reference prediction mode is set as a most probable mode, thereby reducing the entire amount of occurred codes.

(3) When the prediction direction difference is large, a correlation between decoded pictures in reference blocks is low, and a correlation between a block to be processed and a reference block is estimated to be lower than that in the case where the prediction direction difference is small. In this case, not only the prediction directions neighboring to the prediction direction of the reference prediction mode but also the average value mode is set as the most probable mode, thereby reducing the amount of occurred codes.

Further, a block size of a target block is used to switch a coding tree in a most probable mode in addition to the prediction direction difference. If intra prediction modes to be defined are different, an occurrence distribution of the intra prediction modes is also different. In the structure in which the intra prediction modes to be defined depend on a block size, a block size of a target block is used thereby to select a more appropriate coding tree, thereby reducing the amount of occurred codes.

(4) A coding tree is switched by the prediction direction difference between processed prediction modes, and thus the number of coding trees to be created is half the number of prediction directions capable of being derived in the intra prediction modes. A degree of complexity can be remarkably reduced as compared with the structure considering all the combinations.

A bitstream of a moving picture output by the moving picture coding device according to the embodiment described above has a specific data format capable of decoding according to the coding method used in the embodiment, and the moving picture decoding device corresponding to the moving picture coding device can decode the bitstream in the specific data format.

When a wired or wireless network is used in order to exchange a bitstream between the moving picture coding device and the moving picture decoding device, the bitstream may be converted into a data format suitable for a transmission form of a communication path for transmission. In this case, there are provided a moving picture transmitting device for converting a bitstream output by the moving picture coding device into coding data in a data form suitable for a transmission form of a communication path and transmitting it to a network, and a moving picture receiving device for receiving and recovering the coding data from the network into a bitstream, and supplying it to the moving picture decoding device.

The moving picture transmitting device includes a memory for buffering a bitstream output from the moving picture coding device, a packet processing unit for packetizing the bit stream, and a transmitting unit for transmitting the packetized coding data via a network. The moving picture receiving device includes a receiving unit for receiving the packetized coding data via the network, a memory for buffering the received coding data, and a packet processing unit for packetizing the coding data to generate a bitstream, and providing it to the moving picture decoding device.

The coding and decoding processing described above may be achieved as transmitting, accumulating and receiving devices using hardware, or may be achieved in firmware stored in a ROM (Read Only Memory) or flash memory or in software such as computer. The firmware program or software program may be recoded and provided in a computer-readable recording medium, or may be provided from a server via a wired or wireless network, or may be provided as data broadcast in terrestrial or satellite digital broadcasting.

The present invention has been described above based on the embodiment. The embodiment is exemplary, and those skilled in the art can understand that combinations of constituents or processing may be variously changed and the variants are encompassed in the scope of the present invention.

[Item 1]

A picture coding device which codes a picture signal by use of an intra prediction mode selected from a plurality of intra prediction modes in units of block and codes information for specifying the selected intra prediction mode, the picture coding device including: an intra prediction mode selecting unit for selecting an intra prediction mode of a block to be coded; an intra prediction mode storing unit for storing intra prediction modes of coded blocks; a prediction direction difference deriving unit for deriving intra prediction modes of a plurality of reference blocks used for an intra prediction processing of the block to be coded from the intra prediction mode storing unit, and deriving a prediction direction difference indicating a degree of difference in prediction directions of the derived intra prediction modes; a coding tree creating unit for determining a most probable mode as an intra prediction mode candidate of the block to be coded based on the intra prediction modes of the reference blocks used for deriving the prediction direction difference and the prediction direction difference, and creating a coding tree assigned with a bitstream having a shorter code length than other prediction modes for the determined most probable mode; and a coding unit for coding information for specifying an intra prediction mode of the block to be coded according to the coding tree.

[Item 2]

The picture coding device according to item 1, wherein the coding tree creating unit assumes the same intra prediction modes as the intra prediction modes of the reference blocks, and intra prediction modes having prediction directions neighboring to the prediction directions of the intra prediction modes of the reference blocks as most probable modes.

[Item 3]

The picture coding device according to item 1 or 2, wherein the coding tree creating unit has a predetermined upper limit of the prediction direction difference, and when the prediction direction difference is larger than the upper limit, replaces the value of the prediction direction difference with the upper limit.

[Item 4]

A picture coding method which codes a picture signal by use of an intra prediction mode selected from a plurality of intra prediction modes in units of block and codes information for specifying the selected intra prediction mode, the picture coding method including the steps of: selecting an intra prediction mode of a block to be coded; deriving intra prediction modes of a plurality of reference blocks used for an intra prediction processing of the block to be coded from the intra prediction mode storing unit with reference to a memory for storing intra prediction modes of coded blocks, and deriving a prediction direction difference indicating a degree of difference in prediction directions of the derived intra prediction modes; determining a most probable mode as an intra prediction mode candidate of the block to be coded based on the intra prediction modes of the reference blocks used for deriving the prediction direction difference and the prediction direction difference, and creating a coding tree assigned with a bitstream having a shorter code length than other prediction modes for the determined most probable mode; and coding information for specifying an intra prediction mode of the block to be coded according to the coding tree.

[Item 5]

A picture coding program which codes a picture signal by use of an intra prediction mode selected from a plurality of intra prediction modes in units of block and codes information for specifying the selected intra prediction mode, the picture coding program causing a computer to perform the steps of: selecting an intra prediction mode of a block to be coded; deriving intra prediction modes of a plurality of reference blocks used for an intra prediction processing of the block to be coded from the intra prediction mode storing unit with reference to a memory for storing intra prediction modes of coded blocks, and deriving a prediction direction difference indicating a degree of difference in prediction directions of the derived intra prediction modes; determining a most probable mode as an intra prediction mode candidate of the block to be coded based on the intra prediction modes of the reference blocks used for deriving the prediction direction difference and the prediction direction difference, and creating a coding tree assigned with a bitstream having a shorter code length than other prediction modes for the determined most probable mode; and coding information for specifying an intra prediction mode of the block to be coded according to the coding tree.

[Item 6]

A picture coding device which codes a picture signal by use of an intra prediction mode selected from a plurality of intra prediction modes in units of block and codes information for specifying the selected intra prediction mode, the picture coding device including: an intra prediction mode selecting unit for selecting an intra prediction mode of a block to be coded; an intra prediction mode storing unit for storing intra prediction modes of coded blocks; a prediction direction difference deriving unit for deriving intra prediction modes of a plurality of reference blocks used for intra prediction of the block to be coded from the intra prediction mode storing unit, and deriving a prediction direction difference indicating a degree of difference in prediction directions of the derived intra prediction modes; a most probable mode list creating unit for creating a list of most probable modes as intra prediction mode candidates of the block to be coded based on the intra prediction modes of the reference blocks used for deriving the prediction direction difference and the prediction direction difference; a most probable mode determination flag calculating unit for calculating information indicating whether the intra prediction mode of the block to be coded is a most probable mode; a most probable mode determination flag coding unit for coding information indicating whether the intra prediction mode of the block to be coded is a most probable mode; a most probable mode coding unit for, when the intra prediction mode of the block to be coded is a most probable mode, coding information for specifying an intra prediction mode of the block to be coded based on the list; and a non-most probable mode coding unit for, when the intra prediction mode of the block to be coded is a non-most probable mode, coding information for specifying an intra prediction mode of the block to be coded based on the list.

[Item 7]

The picture coding device according to item 6, wherein the most probable mode list creating unit assumes the same intra prediction modes as the intra prediction modes of the reference blocks, and at least either intra prediction modes having prediction directions neighboring to the prediction directions of the intra prediction modes of the reference blocks or an average value mode as most probable modes.

[Item 8]

The picture coding device according to item 6, wherein the non-most probable mode coding unit rearranges elements contained in the list in order of intra prediction mode indexes preset for each intra prediction mode, scans the most probable modes contained in the rearranged list in a scanning order from the last element to the head element, when an intra prediction mode for coding the block to be coded is larger than or equal to the intra prediction mode index indicating the most probable mode, repeats a subtraction processing of subtracting 1 from the non-most probable mode index, and codes the non-most probable mode index subjected to the subtraction processing when the head element in the most probable mode list is completely scanned.

[Item 9]

The picture coding device according to item 6 or 7, wherein the non-most probable mode coding unit switches non-most probable mode coding assignment based on the total number of most probable modes.

[Item 10]

A picture coding method which codes a picture signal by use of an intra prediction mode selected from a plurality of intra prediction modes in units of block and codes information for specifying the selected intra prediction mode, the picture coding method including the steps of: selecting an intra prediction mode of a block to be coded; deriving intra prediction modes of a plurality of reference blocks used for intra prediction of the block to be coded from the intra prediction mode storing unit with reference to a memory for storing intra prediction modes of coded blocks, and deriving a prediction direction difference indicating a degree of difference in prediction directions of the derived intra prediction modes; creating a list of most probable modes as intra prediction mode candidates of the block to be coded based on the intra prediction modes of the reference blocks used for deriving the prediction direction difference and the prediction direction difference; calculating information indicating whether the intra prediction mode of the block to be coded is a most probable mode; coding information indicating whether the intra prediction mode of the block to be coded is a most probable mode; when the intra prediction mode of the block to be coded is a most probable mode, coding information for specifying an intra prediction mode of the block to be coded based on the created list; and when the intra prediction mode of the block to be coded is a non-most probable mode, coding information for specifying an intra prediction mode of the block to be coded based on the list.

[Item 11]

A picture coding program which codes a picture signal by use of an intra prediction mode selected from a plurality of intra prediction modes in units of block and codes information for specifying the selected intra prediction mode, the picture coding program causing a computer to perform the steps of: selecting an intra prediction mode of a block to be coded; deriving intra prediction modes of a plurality of reference blocks used for intra prediction of the block to be coded from the intra prediction mode storing unit with reference to a memory for storing intra prediction modes of coded blocks, and deriving a prediction direction difference indicating a degree of difference in prediction directions of the derived intra prediction modes; creating a list of most probable modes as intra prediction mode candidates of the block to be coded based on the intra prediction modes of the reference blocks used for deriving the prediction direction difference and the prediction direction difference; calculating information indicating whether the intra prediction mode of the block to be coded is a most probable mode; coding information indicating whether the intra prediction mode of the block to be coded is a most probable mode; when the intra prediction mode of the block to be coded is a most probable mode, coding information for specifying an intra prediction mode of the block to be coded based on the created list; and when the intra prediction mode of the block to be coded is a non-most probable mode, coding information for specifying an intra prediction mode of the block to be coded based on the list.

[Item 12]

A picture decoding device which decodes information for specifying an intra prediction mode in units of block from a bit stream and decodes a picture signal by use of information for specifying a decoded intra prediction mode, the picture decoding device including: an intra prediction mode storing unit for storing intra prediction modes of decoded blocks; a prediction direction difference deriving unit for deriving intra prediction modes of a plurality of reference blocks used for an intra prediction processing of a block to be decoded from the intra prediction mode storing unit, and deriving a prediction direction difference indicating a degree of difference in prediction directions of the derived intra prediction modes; a decoding tree creating unit for determining a most probable mode as an intra prediction mode candidate of the block to be decoded based on the intra prediction modes of the reference blocks used for deriving the prediction direction difference and the prediction direction difference, and creating a decoding tree assigned with a bitstream having a shorter code length than other prediction modes for the determined most probable mode; and a decoding unit for decoding information for specifying an intra prediction mode of the block to be decoded according to the decoding tree.

[Item 13]

The picture decoding device according to item 12, wherein the decoding tree creating unit assumes the same intra prediction modes as the intra prediction modes of the reference blocks and intra prediction modes in prediction directions neighboring to the prediction directions of the intra prediction modes of the reference blocks as most probable modes.

[Item 14]

The picture decoding device according to item 12 or 13, wherein the decoding tree creating unit has a predetermined upper limit of the prediction direction difference, and when the prediction direction difference is larger than the upper limit, replaces the value of the prediction direction difference with the upper limit.

[Item 15]

A picture decoding method which decodes information for specifying an intra prediction mode in units of block from a bitstream and decodes a picture signal by use of information for specifying a decoded intra prediction mode, the picture decoding method including the steps of: deriving intra prediction modes of a plurality of reference blocks used for an intra prediction processing of a block to be decoded from the intra prediction mode storing unit with reference to a memory for storing intra prediction modes of decoded blocks, and deriving a prediction direction difference indicating a degree of difference in prediction directions of the derived intra prediction modes; determining a most probable mode as an intra prediction mode candidate of the block to be decoded based on the intra prediction modes of the reference blocks used for deriving the prediction direction difference and the prediction direction difference, and creating a decoding tree assigned with a bitstream having a shorter code length than other prediction modes for the determined most probable mode; and decoding information for specifying an intra prediction mode of the block to be decoded according to the decoding tree.

[Item 16]

A picture decoding program which decodes information for specifying an intra prediction mode in units of block from a bitstream and decodes a picture signal by use of information for specifying a decoded intra prediction mode, the picture decoding program causing a computer to perform the steps of: deriving intra prediction modes of a plurality of reference blocks used for an intra prediction processing of a block to be decoded from the intra prediction mode storing unit with reference to a memory for storing intra prediction modes of decoded blocks, and deriving a prediction direction difference indicating a degree of difference in prediction directions of the derived intra prediction modes; determining a most probable mode as an intra prediction mode candidate of the block to be decoded based on the intra prediction modes of the reference blocks used for deriving the prediction direction difference and the prediction direction difference, and creating a decoding tree assigned with a bitstream having a shorter code length than other prediction modes for the determined most probable mode; and decoding information for specifying an intra prediction mode of the block to be decoded according to the decoding tree.

[Item 17]

A picture decoding device which decodes information for specifying an intra prediction mode in units of block from a bitstream, and decodes a picture signal by use of information for specifying a decoded intra prediction mode, the picture decoding device including: an intra prediction mode storing unit for storing intra prediction modes of decoded blocks; a prediction direction difference deriving unit for deriving intra prediction modes of a plurality of reference blocks used for an intra prediction processing of a block to be decoded from the intra prediction mode storing unit, and deriving a prediction direction difference indicating a degree of difference in prediction directions of the derived intra prediction modes; a most probable mode list creating unit for creating a list of most probable modes as intra prediction mode candidates of the block to be decoded based on the intra prediction modes of the reference blocks used for deriving the prediction direction difference and the prediction direction difference; a most probable mode determination flag decoding unit for decoding information indicating whether the intra prediction mode of the block to be decoded is a most probable mode; a most probable mode decoding unit for, when the intra prediction mode of the block to be decoded is a most probable mode, decoding information for specifying an intra prediction mode of the block to be decoded based on the created list; and a non-most probable mode decoding unit for, when the intra prediction mode of the block to be decoded is a non-most probable mode, decoding information for specifying an intra prediction mode of the block to be decoded based on the list.

[Item 18] The picture decoding device according to item 17, wherein the most probable mode list creating unit assumes the same intra prediction modes as the intra prediction modes of the reference blocks, and at least either intra prediction modes in prediction directions neighboring to the prediction directions of the intra prediction modes of the reference blocks or an average value mode as most probable modes.

[Item 19]

The picture decoding device according to item 17, wherein the non-most probable mode decoding unit rearranges elements contained in the list in ascending order of intra prediction mode indexes preset for each intra prediction mode, scans the most probable modes contained in the rearranged list from the head, when a non-most probable mode index decoded and directly derived from the bitstream is larger than or equal to an intra prediction mode index indicating the most probable mode, repeats an addition processing of adding 1 to the non-most probable mode index, and assumes an intra prediction mode of the non-most probable mode index subjected to the addition processing when the last element in the most probable mode list is completely scanned as an intra prediction mode of the block to be decoded.

[Item 20]

The picture decoding device according to item 17 or 18, wherein the non-most probable mode decoding unit switches non-most probable mode coding assignment based on the total number of most probable modes.

[Item 21]

A picture decoding method which decodes information for specifying an intra prediction mode in units of block from a bitstream and decodes a picture signal by use of information for specifying a decoded intra prediction mode, the picture decoding method including the steps of: deriving intra prediction modes of a plurality of reference blocks used for an intra prediction processing of a block to be decoded from the intra prediction mode storing unit with reference to a memory for storing intra prediction modes of decoded blocks, and deriving a prediction direction difference indicating a degree of difference in prediction directions of the derived intra prediction modes; creating a list of most probable modes as intra prediction mode candidates of the block to be decoded based on the intra prediction modes of the reference blocks used for deriving the prediction direction difference and the prediction direction difference; decoding information indicating whether the intra prediction mode of the block to be decoded is a most probable mode; when the intra prediction mode of the block to be decoded is a most probable mode, decoding information for specifying an intra prediction mode of the block to be decoded based on the created list; and when the intra prediction mode of the block to be decoded is a non-most probable mode, decoding information for specifying an intra prediction mode of the block to be decoded based on the list.

[Item 22]

A picture decoding program which decodes information for specifying an intra prediction mode in units of block from a bit stream and decodes a picture signal by use of information for specifying a decoded intra prediction mode, the picture decoding program causing a computer to perform the steps of: deriving intra prediction modes of a plurality of reference blocks used for an intra prediction processing of a block to be decoded from the intra prediction mode storing unit with reference to a memory for storing intra prediction modes of decoded blocks, and deriving a prediction direction difference indicating a degree of difference in prediction directions of the derived intra prediction modes; creating a list of most probable modes as intra prediction mode candidates of the block to be decoded based on the intra prediction modes of the reference blocks used for deriving the prediction direction difference and the prediction direction difference; decoding information indicating whether the intra prediction mode of the block to be decoded is a most probable mode; when the intra prediction mode of the block to be decoded is a most probable mode, decoding information for specifying an intra prediction mode of the block to be decoded based on the created list; and when the intra prediction mode of the block to be decoded is a non-most probable mode, decoding information for specifying an intra prediction mode of the block to be decoded based on the list.

What is claimed is:

1. A picture coding device which codes a picture signal by use of an intra prediction mode selected from a plurality of intra prediction modes in units of block and codes information for specifying the selected intra prediction mode, the picture coding device comprising:
an intra prediction mode selecting unit configured to select an intra prediction mode of a block to be coded;
an intra prediction mode storing unit configured to store intra prediction modes of coded blocks;
a prediction direction difference deriving unit configured to derive intra prediction modes of a plurality of reference blocks used for an intra prediction processing of the block to be coded from the intra prediction mode storing unit, and derive a prediction direction difference indicating a degree of difference in prediction directions of the derived intra prediction modes, and when the prediction direction difference is larger than a predetermined upper limit, replace a value of the prediction direction difference with the upper limit;

a coding tree creating unit configured to determine most probable prediction modes as intra prediction mode candidates of the block to be coded based on the intra prediction modes of the reference blocks and the prediction direction difference, and create a coding tree assigned with a bitstream having a shorter code length than other prediction modes for the determined most probable prediction modes; and a coding unit configured to code information for specifying an intra prediction mode of the block to be coded according to the coding tree.

2. A picture coding method which codes a picture signal by use of an intra prediction mode selected from a plurality of intra prediction modes in units of block and codes information for specifying the selected intra prediction mode, the picture coding method comprising:

an intra prediction mode selecting step of selecting an intra prediction mode of a block to be coded;

a prediction direction difference deriving step of deriving intra prediction modes of a plurality of reference blocks used for an intra prediction processing of the block to be coded with reference to a memory for storing intra prediction modes of coded blocks, and deriving a prediction direction difference indicating a degree of difference in prediction directions of the derived intra prediction modes, and when the prediction direction difference is larger than a predetermined upper limit, replacing a value of the prediction direction difference with the upper limit;

a coding tree creating step of determining most probable prediction modes as intra prediction mode candidates of the block to be coded based on the intra prediction modes of the reference blocks and the prediction direction difference, and creating a coding tree assigned with a bit stream having a shorter code length than other prediction modes for the determined most probable prediction modes; and a coding step of coding information for specifying an intra prediction mode of the block to be coded according to the coding tree.

3. A non-transitory recording medium storing therein a picture coding program which codes a picture signal by use of an intra prediction mode selected from a plurality of intra prediction modes in units of block and codes information for specifying the selected intra prediction mode, the picture coding program causing a computer to perform:

an intra prediction mode selecting step of selecting an intra prediction mode of a block to be coded;

a prediction direction difference deriving step of deriving intra prediction modes of a plurality of reference blocks used for an intra prediction processing of the block to be coded with reference to a memory for storing intra prediction modes of coded blocks, and deriving a prediction direction difference indicating a degree of difference in prediction directions of the derived intra prediction modes, and when the prediction direction difference is larger than a predetermined upper limit, replacing a value of the prediction direction difference with the upper limit;

a coding tree creating step of determining most probable prediction modes as intra prediction mode candidates of the block to be coded based on the intra prediction modes of the reference blocks and the prediction direction difference, and creating a coding tree assigned with a bit stream having a shorter code length than other prediction modes for the determined most probable prediction modes; and a coding step of coding information for specifying an intra prediction mode of the block to be coded according to the coding tree.

* * * * *